(12) United States Patent
Eisenschmidt et al.

(10) Patent No.: US 7,198,321 B2
(45) Date of Patent: Apr. 3, 2007

(54) CONVERTIBLE VEHICLE

(75) Inventors: Jens Eisenschmidt, Pforzheim (DE); Joerg Riehle, Asperg (DE)

(73) Assignee: ORIS Fahrzeugteile Hans Riehle GmbH, Moelingen (DE)

( * ) Notice: Subject to any disclaimer, the term of this patent is extended or adjusted under 35 U.S.C. 154(b) by 63 days.

(21) Appl. No.: 10/937,114

(22) Filed: Sep. 8, 2004

(65) Prior Publication Data

US 2005/0057072 A1    Mar. 17, 2005

(30) Foreign Application Priority Data

Sep. 9, 2003   (DE) .............................. 103 41 989

(51) Int. Cl.
*B62D 35/00*     (2006.01)
(52) U.S. Cl. .................................. 296/180.1
(58) Field of Classification Search ............ 296/180.1, 296/180.2, 180.3, 180.4, 180.5
See application file for complete search history.

(56) References Cited

U.S. PATENT DOCUMENTS

| 5,702,150 | A | * | 12/1997 | Reuter et al. ............ 296/180.1 |
| 5,707,099 | A | | 1/1998 | Schrader et al. |
| 6,557,928 | B2 | | 5/2003 | Dreher et al. |
| 2002/0041108 | A1 | * | 4/2002 | Brettmann ............... 296/180.1 |
| 2002/0105208 | A1 | * | 8/2002 | Dreher et al. ............ 296/180.1 |
| 2003/0205912 | A1 | * | 11/2003 | Dreher et al. ............ 296/180.1 |

FOREIGN PATENT DOCUMENTS

| DE | 41 19 529 | 12/1992 |
| DE | 196 02 598 | 3/1997 |
| DE | 195 36 552 | 4/1997 |
| DE | 196 32 352 | 2/1998 |
| DE | 197 52 068 | 5/1999 |
| DE | 100 35 995 | 2/2002 |
| DE | 101 31 397 | 1/2003 |
| EP | 0 965 470 | 12/1999 |

* cited by examiner

*Primary Examiner*—Lori L. Coletta
(74) *Attorney, Agent, or Firm*—Lipsitz & McAllister,

(57) ABSTRACT

In order to improve a convertible vehicle comprising a vehicle body with a passenger compartment, a roll-over protection device which is arranged behind a row of seats and has at least two uprights arranged transversely to a longitudinal direction of the vehicle body at a distance from one another and rising above the vehicle body and at least one cross bar extending between at least two uprights, and a wind stop device which is arranged behind the at least one row of seats and reduces a flow of air through the at least one free space of the roll-over protection device, in such a manner that the wind stop device in combination with the roll-over protection device is easier to manage it is suggested that the wind stop device have a flat material guiding device and a wind-deflecting flat material held by the flat material guiding device, that the flat material guiding device hold the wind-deflecting flat material in an active position in a surface intersecting the uprights and thereby close the at least one free space in a wind inhibiting manner and that the wind-deflecting flat material be adapted to be brought by means of the flat material guiding device from the active position into a stowing position located in the vehicle body and vice versa.

52 Claims, 19 Drawing Sheets

CONVERTIBLE VEHICLE

The present disclosure relates to the subject matter disclosed in German application No. 103 41 989.6-21 of Sep. 9, 2003, which is incorporated herein by reference in its entirety and for all purposes.

BACKGROUND OF THE INVENTION

The invention relates to a convertible vehicle comprising a vehicle body with a passenger compartment, at least one row of seats arranged in the passenger compartment, a roll-over protection device which is arranged behind the at least one row of seats and has a free space facing a rear of the body, this protection device having at least two uprights which are arranged transversely to a longitudinal direction of the vehicle body at a distance from one another and rise above the vehicle body and at least one cross bar extending between the uprights, and a wind stop device which is arranged behind the at least one row of seats and reduces a flow of air through the at least one free space of the roll-over protection device.

A vehicle of this type is known from DE 195 34 584.

The disadvantage of such a convertible vehicle is to be seen in the fact that the wind stop device is unwieldy.

The object underlying the invention is therefore to improve a convertible vehicle of the generic type in such a manner that the wind stop device in combination with the roll-over protection device is easier to manage.

SUMMARY OF THE INVENTION

This object is accomplished in accordance with the invention, in a convertible vehicle of the type described at the outset, in that the wind stop device has a flat material guiding device and a wind-deflecting flat material held by the flat material guiding device, this flat material being held by the flat material guiding device in an active position in a surface intersecting the uprights and thereby closing the at least one free space in a wind inhibiting manner, and that the wind-deflecting flat material can be brought by means of the flat material guiding device from the active position into a stowing position located in the vehicle body and vice versa.

The advantage of the inventive solution is to be seen in the fact that, on the one hand, the flat material guiding device holds the wind-deflecting flat material in the active position in a surface intersecting the uprights of the wind stop device so that the wind-deflecting flat material does not protrude beyond the roll-over protection device and that, in addition, the flat material guiding device offers the possibility of bringing the wind-deflecting flat material into the stowing position guided by the flat material guiding device and vice versa. As a result, the disadvantageous attachment of the wind-deflecting flat material to the roll-over protection device, which is known from the state of the art, is dispensed with and also the manual release of the wind-deflecting flat material from the roll-over protection device and transportation of the wind-deflecting flat material into the stowing position.

In principle, it would be conceivable to design the flat material guiding device such that this can be actuated manually in order to move the flat material between the active position and the stowing position.

It is particularly favorable when the flat material guiding device is provided with a drive in order to move the wind-deflecting flat material between the active position and the stowing position and vice versa.

In this respect, the drive is preferably designed as an electric drive.

With respect to the arrangement of the stowing position, no further details are given. One particularly advantageous solution, for example, provides for a stowing receiving means for the wind-deflecting flat material in the stowing position to be provided in the vehicle body, this receiving means being arranged adjacent to the roll-over protection device.

With such a stowing receiving means adjacent to the roll-over protection device, the wind-deflecting flat material may be moved particularly favorably by the flat material guiding device between the active position and the stowing position.

The stowing receiving means could, for example, be accessible via the passenger compartment of the vehicle body.

It is, however, particularly favorable when the stowing receiving means has an exit opening for the flat material which faces the roll-over protection device so that the flat material exiting from it can be brought immediately into its active position after exiting from the exit opening.

It is particularly favorable when the surface, in which the flat material extends in the active position, passes through the exit opening so that only a movement of the flat material in the surface, in which it extends in its active position, is necessary in order to move the flat material through the exit opening into the stowing receiving means.

In order to be able to close the exit opening when the flat material guiding device is located in the stowing position, it would be conceivable to provide a separate closure element.

The inventive solution is, however, particularly favorable when the flat material guiding device comprises a closure element for the exit opening.

In this respect, the closure element can preferably be moved between the stowing position and the active position by means of the movements of the flat material guiding device and closes the exit opening in the stowing position of the flat material guiding device.

With respect to the design of the flat material, the most varied of possibilities are conceivable. It would be conceivable, for example, to design the flat material as a self-supporting, wind-deflecting flat material consisting, for example, of a wire or plastic mesh which is rigid in itself or reinforcing at least as an outer frame due to its inherent rigidity.

With respect to possible stowage of the flat material, it has proven to be particularly favorable when the wind-deflecting flat material is a slack material not resistant to bending.

In the case of a slack material not resistant to bending or also in the case of a flat material with insufficient inherent rigidity it is, in particular, favorable when the flat material guiding device comprises a tensioning device, with which the flat material can be tensioned in the active position over the free space.

Such a tensioning device may be designed in the most varied of ways.

One type of tensioning device provides for this to comprise a bracket which is movable in a guide means and keeps the wind-deflecting flat material tensioned in a transverse direction.

Alternatively to this solution, another solution preferred, in particular, for slack flat material not resistant to bending provides for the tensioning device to have two arms pivotable between an active position and a stowing position, these arms keeping the flat material tensioned in the transverse direction in the active position.

In this respect, the arms are preferably mounted so as to be pivotable close to the uprights limiting the respective, at least one free space on the outer side and extend approximately parallel to the uprights in the active position.

Furthermore, the arms preferably extend transversely to the uprights in the stowing position.

In order to ensure, in the case of a slack wind-deflecting flat material not resistant to bending, that this can be positioned in the stowing position so as to be kinked as little as possible, the flat material guiding device is preferably designed such that it comprises a drawing-in device arranged in the vehicle body for moving the flat material into the stowing position.

Such a drawing-in device could be designed, for example, such that it positions the wind-deflecting flat material in loop-shaped layers.

A particularly simple drawing-in device provides for the drawing-in device to comprise a winding device for the wind-deflecting flat material.

An alternative embodiment of the flat material guiding device provides for this to comprise a frame accommodating the flat material and a displacement guide means for the movement of the frame between a stowing position and an active position.

It is possible with such a frame to align, hold and guide not only slack flat material non-resistant to bending but also flat material which is inherently rigid, such as, for example, metal or plastic mesh.

It is particularly favorable when the frame is arranged in the stowing position so as to extend as a whole in the vehicle body by means of the displacement guide means.

With respect to the design of the frame for holding the flat material, the most varied of possibilities are conceivable.

A simple possibility provides for the flat material guiding device to be designed such that this has a one-part frame for holding the flat material.

In this respect, the one-part frame is designed, for example, such that it positions the flat material in all the free spaces so as to be wind inhibiting in the active position of the flat material guiding device.

Particularly in the case of an embodiment with inner uprights, this results in the one-part frame having to extend through the inner uprights.

Alternatively to providing a one-part frame, the flat material guiding device is designed in another embodiment such that it has a multipart frame.

Such a multipart frame is designed, for example, such that this comprises several partial frames held by a common support.

When providing several partial frames of this type, it is possible, in particular, with the presence of inner uprights to design these such that the frame need not pass through the inner uprights but is merely guided, for example, on the inner uprights or is supported by abutting on them.

In this respect, the multipart frame is, however, likewise preferably designed such that all the partial frames can be moved from the active position into the stowing position and vice versa together, preferably by means of a common drive device.

In this respect, the frame is preferably located in the stowing position in a surface extending transversely to the longitudinal direction of the vehicle, wherein the surface preferably coincides with the surface, in which the frame extends in the active position.

With respect to the design of the roll-over protection device itself, no further details have so far been given.

A simple form of the roll-over protection device provides for this to comprise two outer uprights which are connected by the cross bar, face longitudinal sides of the vehicle body located respectively opposite and are arranged, in particular, close to the same.

In this case, the roll-over protection device preferably has a free space enclosed by the outer uprights and the cross bar.

Another preferred solution provides for the roll-over protection device to comprise two roll-over protection elements, each of which has two uprights and a cross bar.

In this respect, the roll-over protection elements are preferably designed such that they have an outer upright, which is arranged so as to face the respective longitudinal side of the vehicle body, and an inner upright which are connected to one another by the cross bar.

With respect to the free spaces formed in such a roll-over protection device, the most varied of possibilities are conceivable. In one case, a free space of the roll-over protection device is expediently located between the roll-over protection elements, wherein this free space cannot be limited, for example, by a cross bar on a side located opposite the vehicle body.

In addition, it is possible not to provide any free space within the roll-over protection elements. For optical reasons and for reasons of a favorable flow guidance it is preferably provided for each of the roll-over protection elements to have an additional free space surrounded by the uprights and the cross bars.

With respect to the integration of the flat material guiding device and the uprights, no further details have so far been given. One advantageous solution, for example, provides for at least two of the uprights to have at least one receiving means for the flat material guiding device.

For example, it is provided in this connection for the outer uprights to each have a receiving means.

Alternatively or in addition hereto, it is provided for at least one inner upright to have at least one receiving means.

It is particularly expedient when the outer uprights have the receiving means so that the wind-deflecting flat material expediently extends in the transverse direction between the outer uprights of the roll-over protection device.

Furthermore, it is preferably provided for at least one of the inner uprights to have the flat material located in the active position passing through it.

In order to be able to realize this, the inner uprights are preferably provided with transverse openings which pass through them completely in the transverse direction and preferably extend from the vehicle body as far as the cross bars.

With respect to the design of the uprights themselves, in particular, in relation to the support structure of the roll-over protection device, no further details have so far been given. One preferred solution, for example, provides for the uprights to have an outer housing forming the support structure.

In addition, it is also preferably provided for the cross bars to have an outer housing forming the support structure.

Another solution which can, in particular, be configured in an esthetically favorable manner provides for the uprights to have an upright housing and a support structure extending in the upright housing. In this case, a separation has therefore been brought about between the upright housing and the support structure which makes it possible, on the one hand, to design the support structure in as inexpensive and stable a manner as possible and, on the other hand, to realize the optical appearance of the uprights via the upright housing separated from the support structure.

In the same way, it is also preferably provided for the at least one cross bar to have a cross bar housing and a support structure and so a separation is also brought about in the area of the cross bar between the cross bar housing which has to be of an esthetical configuration and the support structure.

Especially when the flat material passes through at least one of the uprights in the active position, it is advantageous when the support structure is arranged on one side of the surface, in which the flat material extends in the active position, while only the corresponding part of the upright housing or of the cross bar housing is arranged on the other side of the surface.

This also preferably applies for the support structure in the area of the cross bar which is preferably arranged on the same side of the surface as the support structure of the uprights.

Additional features and advantages are the subject matter of the following description as well as the drawings illustrating several embodiments.

DETAILED DESCRIPTION OF THE INVENTION

Figure 1:
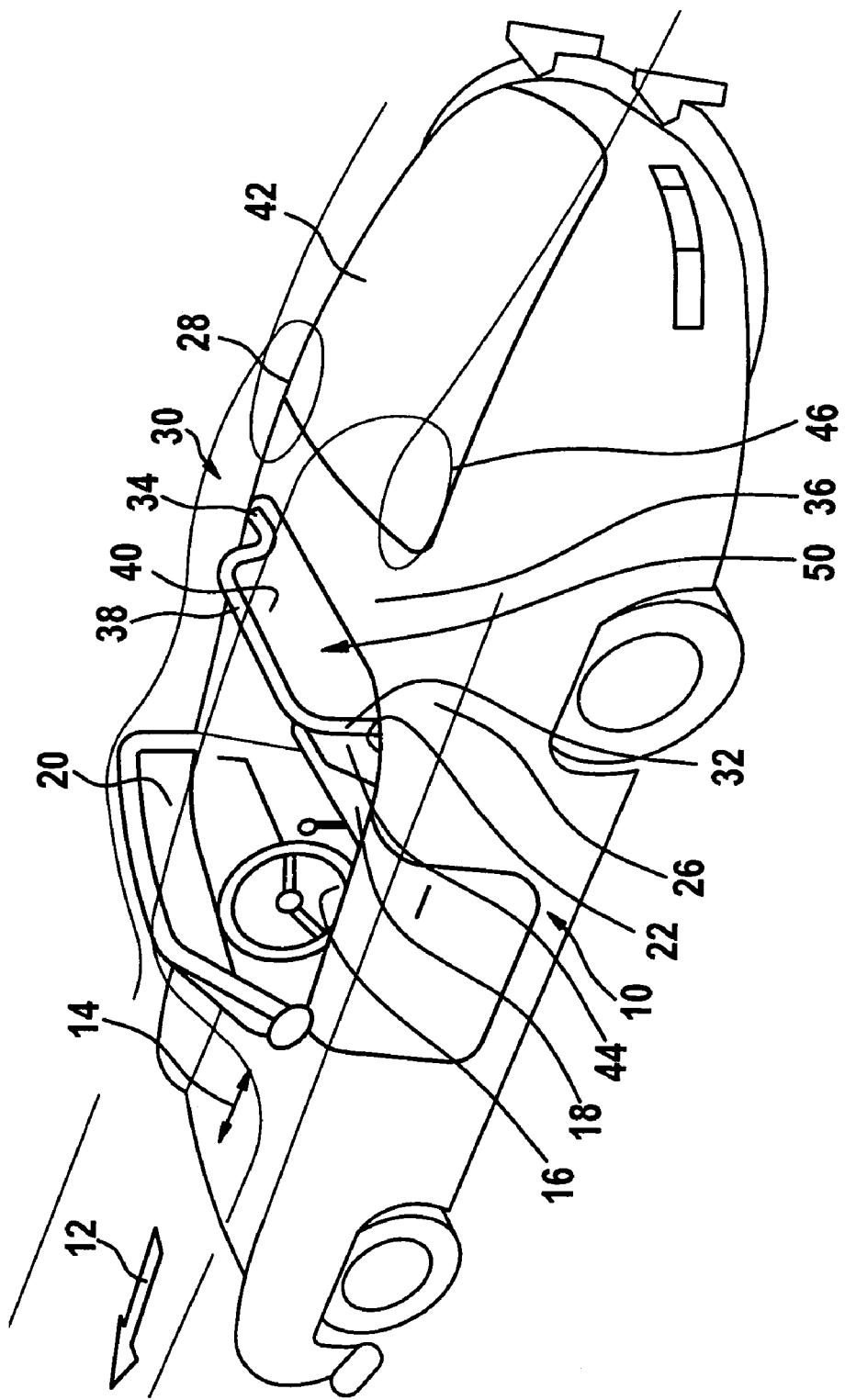
FIG. 1 shows a perspective illustration of a first embodiment of an inventive convertible vehicle.

A first embodiment of a convertible vehicle illustrated in FIG. 1 comprises a vehicle body 10 with a longitudinal direction 14 extending in a direction of travel 12 and with a passenger compartment 16 which is arranged in the vehicle body 10 and in which are least one row of seats 18 is arranged.

A roll-over protection device designated as a whole as 30 is arranged in the area of a rear end 22 of the passenger compartment 16 located opposite a windshield 20 and, in the first embodiment, has two outer uprights 32, 34 which are arranged close to respective longitudinal sides 26, 28 of the vehicle body 10 and, therefore, at a distance from one another, project upwards beyond an upper side 36 of the vehicle body 10 adjoining the rear end 22 of the passenger compartment 16 and are connected to one another by a cross bar 38.

The outer uprights 34 and the cross bar 38 enclose a free space 40 of the roll-over protection device 30 which enables the driver in the passenger compartment 16 to look through the roll-over protection device 30 in the direction of a rear end 42 of the vehicle body 10.

In order to avoid draft phenomena from air vortices 46, which form behind the passenger compartment 16 and the roll-over protection device 30, in a head area 44 of passengers which is located behind the windshield 20 and above the row of seats 18, the roll-over protection device 30 is combined with a wind stop device 50 which hinders any spreading of the air vortices 46 in the direction of the head area 44 of the passengers.

Figure 2:
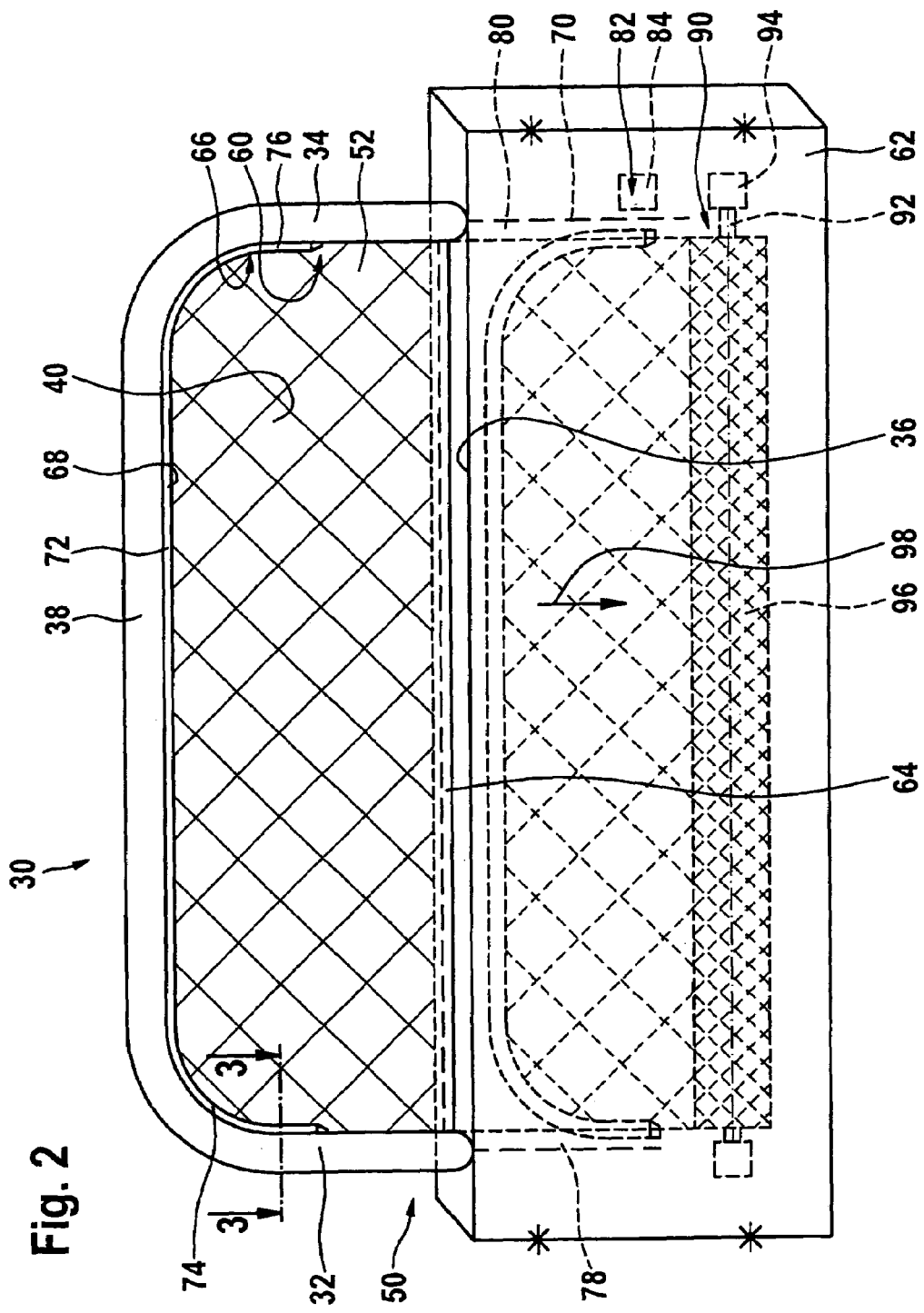
FIG. 2 shows a schematic illustration of roll-over protection device, wind stop device and stowing receiving means in the first embodiment.

This wind stop device 50 comprises, as shown in detail in FIG. 2, a flat material 52 which is, on the one hand, at least limitedly transparent and, on the other hand, permeable to air but is wind-deflecting and which therefore closes the free space 40 in the roll-over protection device 30 in a wind inhibiting manner in the active position illustrated in FIG. 2 and, consequently, suppresses the flows of air which disturb the passengers on account of these properties.

In the first embodiment, the flat material 52 is, for example, a slack flat material which is non-resistant to bending and can be brought by means of a flat material guiding device designated as a whole as 60 into the active position, illustrated in FIG. 2 by solid lines, in which the flat material 52 closes the free space 40, and, on the other hand, can be brought into a stowing position illustrated in FIG. 2 by dashed lines in the vehicle body 10 beneath the upper side 36, in which the flat material 52 releases the free space 40, wherein in the stowing position the flat material 52 is arranged in a stowing receiving means 62 within the vehicle body 10 which has an exit opening 64, from which the flat material 52 can exit in order to reach the active position. In this respect, the exit opening 64 preferably extends between the outer uprights 32 and 34 over the entire width of the free space 40.

The flat material guiding device 60 comprises, in the first embodiment, a tensioning device which is designated as a whole as 66 and has a bracket 68 which is guided in a vertical guide means 70 and can be moved with this vertical guide means 70 between an active position and a stowing position.

In the active position, the bracket 68 abuts with a transverse strut 72 on an underside of the cross bar 38 and extends with side struts 74 and 76 at least over a partial section of the outer uprights 32 and 34 adjoining the cross bar 38, wherein the side struts 74 and 76 are guided in guide rails 78 and 80 of the vertical guide means 70 and wherein the guide rails 78 and 80 extend into the stowing receiving means 62 to such an extent that the entire bracket 68 can be moved from the active position, illustrated in FIG. 2 by solid lines, into a stowing position, illustrated in FIG. 2 by dashed lines, in which the entire bracket 68 is arranged in the stowing receiving means 62 and does not protrude beyond the exit opening 64 of the stowing receiving means.

The bracket 68 can be moved manually. However, it is preferred for the bracket 68 to be moved by means of a drive 82 which comprises, for example, a drive motor 84 and cable lines which act on the side struts 74 and 76 of the bracket 68 but are not illustrated in FIG. 2 and which can be driven by the drive motor 84 in order to move the bracket 68 from the active position into the stowing position and vice versa.

Since the flat material 52 is preferably a slack flat material non-resistant to bending, it is necessary to draw this into the stowing receiving means 62 when the bracket 68 is displaced from the active position into the stowing position.

For this reason, a drawing-in device 90 is provided for this purpose which, in the first embodiment, is designed as a winding device with a winding shaft 92 and a winding drive 94, with which the flat material 52 can be wound onto the winding shaft 92 to form a wound package 96, namely over its entire width between the outer uprights 32 and 34.

The winding drive 94 can, for example, be a spring-loaded drive so that the flat material 52 is acted upon with tension by the winding shaft 92 not only in the stowing position of the bracket 68 but also in the active position of the bracket 68 and is, therefore, always kept tensioned between the bracket 68 and the winding shaft 92 in winding direction 98.

Figure 3:
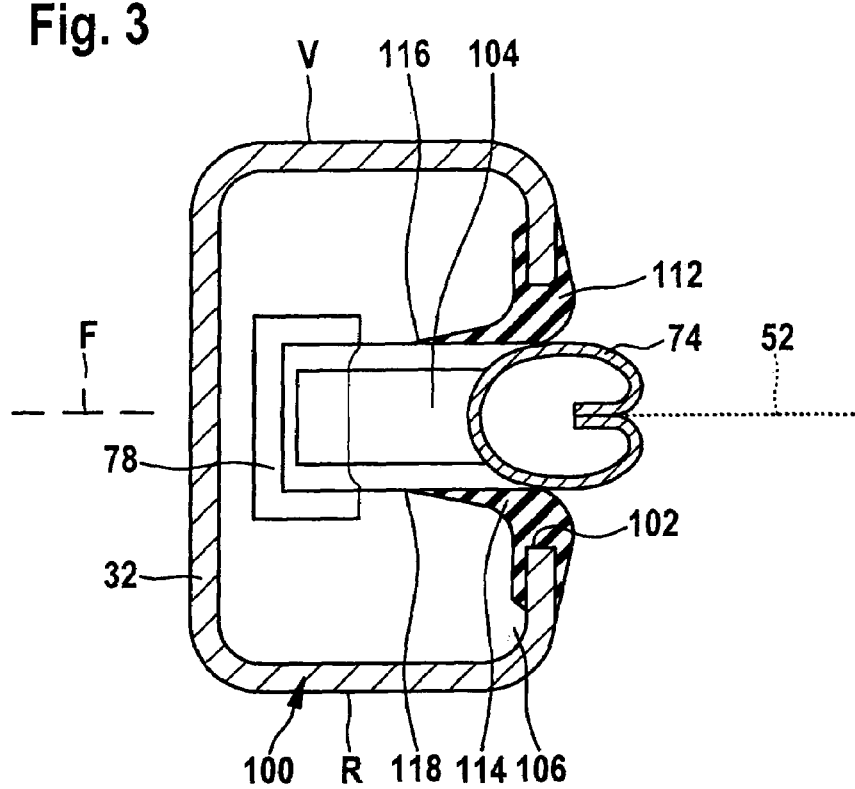
FIG. 3 shows a section along line 3—3 in FIG. 1.
Figure 4:
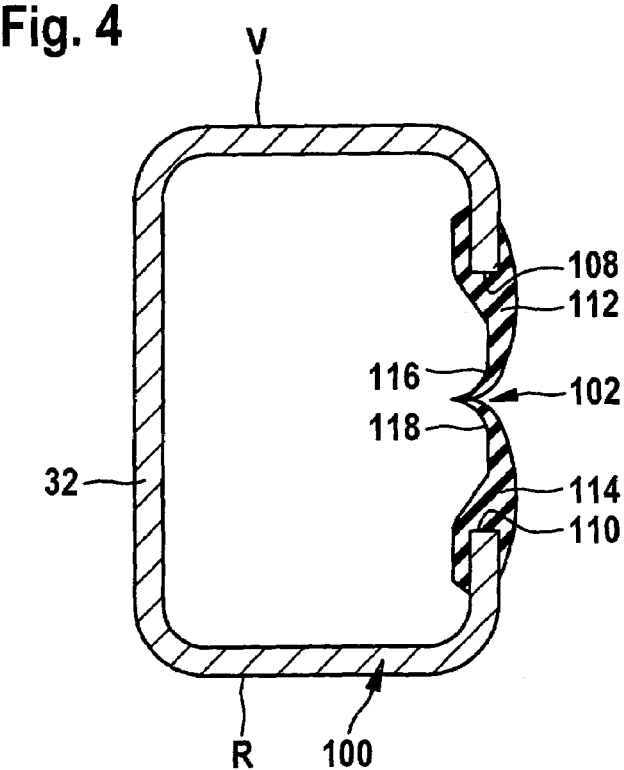
FIG. 4 shows a section corresponding to FIG. 3 in the case of wind-deflecting flat material located in the stowing position.

As illustrated in FIG. 3, not only the outer uprights 32 and 34 of the first embodiment but also the cross bar 38 are designed such that they themselves form a support structure 100 due to their design as stable metal tubes, wherein for the partial accommodation of the side struts 74 and 76 in sides of the uprights 32, 34 facing one another these outer uprights 32, 34 are provided with an opening 102 which extends in longitudinal direction thereof and in which the side struts 74 and 76 engage in part so that guide members 104 held on the side struts 74 and 76 can extend in an interior 106 of the support structure and can be guided in the guide rails 78 likewise extending within the interior 106 so that the opening 102 forms a receiving means for the flat material guiding device 60 together with the interior 106.

The opening 102 is preferably provided with elastic lips 112 and 114 which are held on edges 108, 110 thereof and which close the opening 102 in the state not acted upon in that they abut on one another with their inner ends 116 and 118 whereas the lips 112 and 114 can be pressed apart by the side struts 74 and 76 partially penetrating them in order to allow the side struts 74 and 76 to partially enter the opening 102.

In contrast to the outer uprights 32 and 34, an opening 102 in the area of the cross bar 38 is not necessary since the bracket 68 with the transverse strut 72 can abut on an underside of the cross bar 38 in the active position.

As illustrated in FIG. 3, the flat material 52 is therefore located in the active position in a plane F which extends transversely to the longitudinal direction 14 of the vehicle and intersects the outer uprights 32 and 34 and, in the first embodiment, also the support structure 100 as well as the exit opening 64 so that the web of flat material 52 is located altogether between a front side V and a rear side R of the uprights 32, 34.

Figure 5:
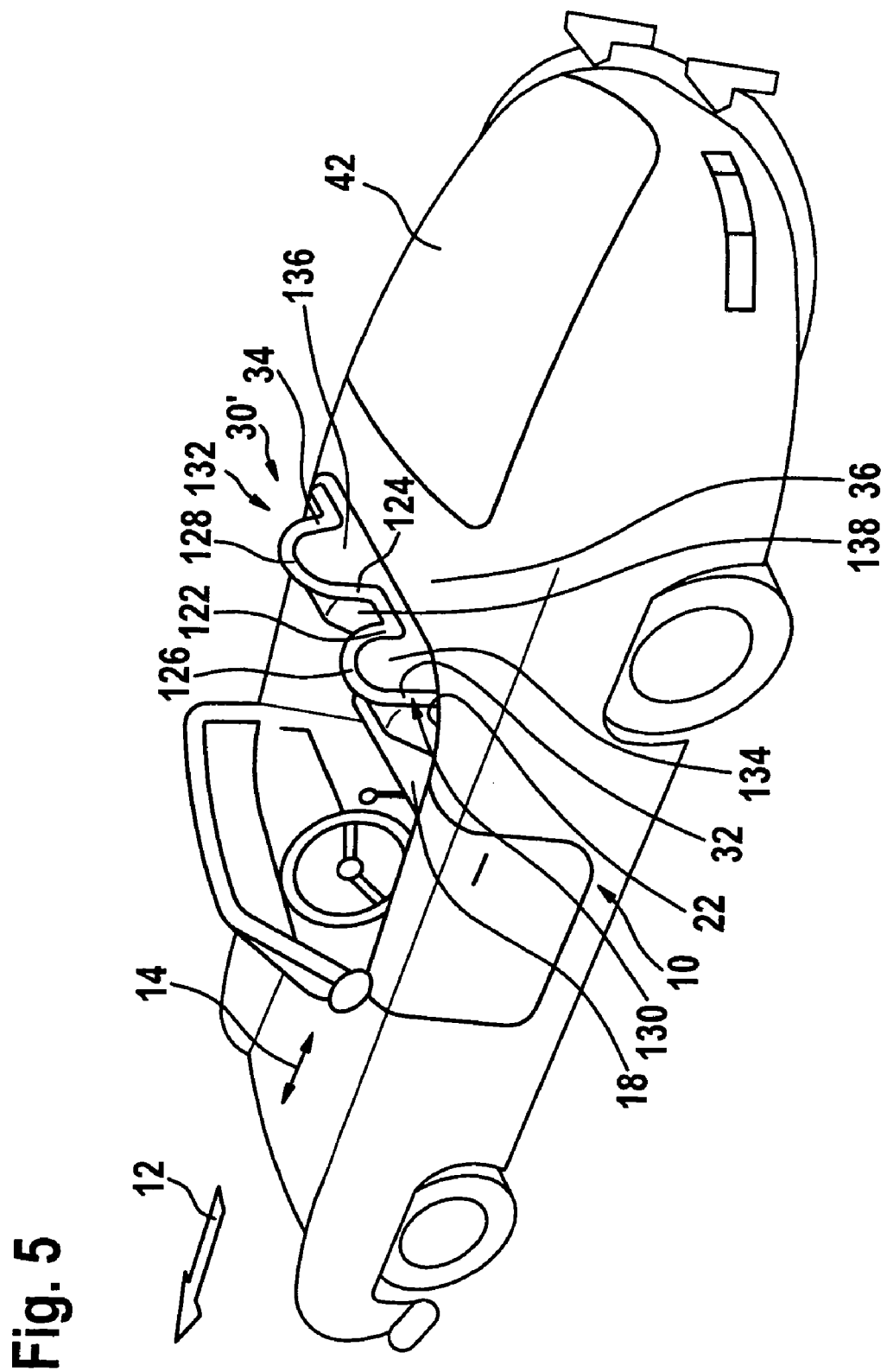
FIG. 5 shows an illustration similar to FIG. 1 of a second embodiment.

In a second embodiment of an inventive convertible vehicle, illustrated in FIG. 5, those elements which are identical to those of the first embodiment are given the same reference numerals and so with respect to the description thereof reference can be made in full to the explanations concerning the first embodiment.

In contrast to the first embodiment, the roll-over protection device 30' is provided not only with the outer uprights 32 and 34 but also with inner uprights 122 and 124 which are located, in addition, between the outer uprights 32 and 34 and likewise arranged at a distance from one another.

Furthermore, no cross bar extending between the outer uprights 32 and 34 is present but rather respective cross bars 126, 128 are provided between a respective outer upright 32, 34 and an inner upright 122 and 124, respectively, associated with it so that, altogether, the roll-over protection device 30' comprises two roll-over protection elements 130, 132, each of which is arranged, for example, behind one of the seats in the row of seats 18.

As a result, the roll-over protection device 30' has altogether in the area of each of the roll-over protection elements 130, 132 a free space 134 and 136, respectively, enclosed by the respective outer upright 32, 34 and the corresponding inner upright 122 and 124, respectively, and the respective cross bar 126 or 128 as well as a free space 138 which is located between the inner uprights 122, 124 of the roll-over protection elements 130, 132 and is not closed by a cross bar located opposite the upper side 36 of the vehicle body 10.

Figure 6:
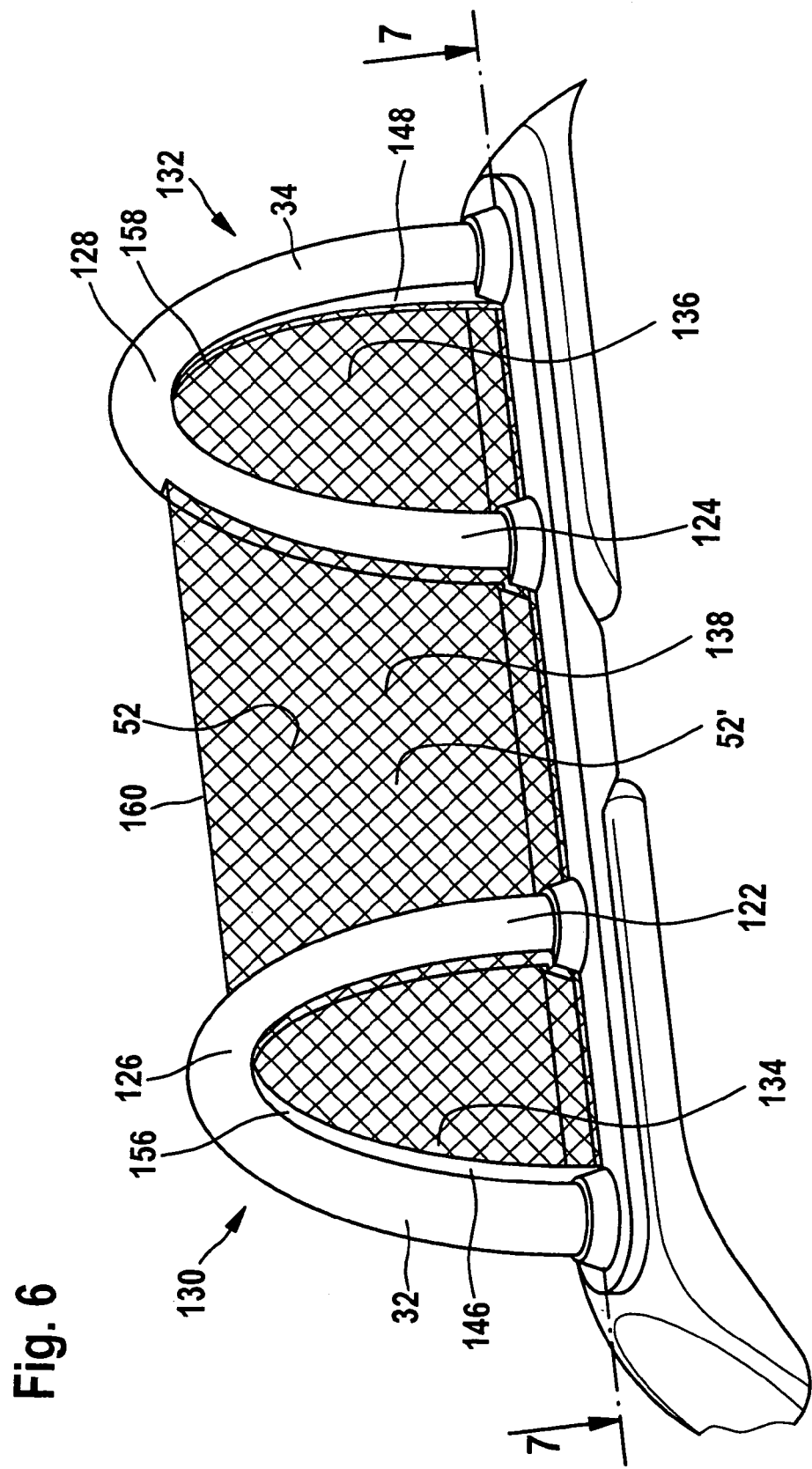
FIG. 6 shows an enlarged, sectional illustration of roll-over protection device and wind stop device in active position of the wind-deflecting flat material.
Figure 7:
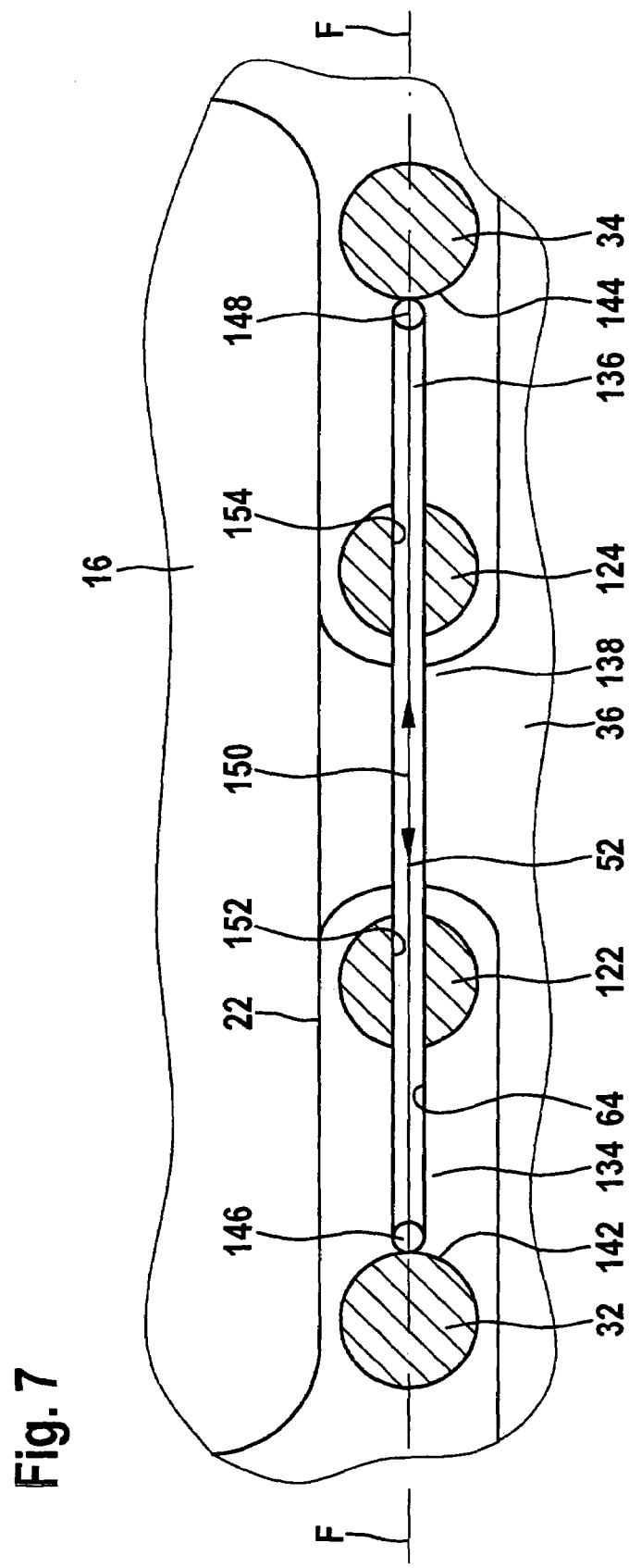
FIG. 7 shows a section along line 7—7 in FIG. 6.
Figure 8:
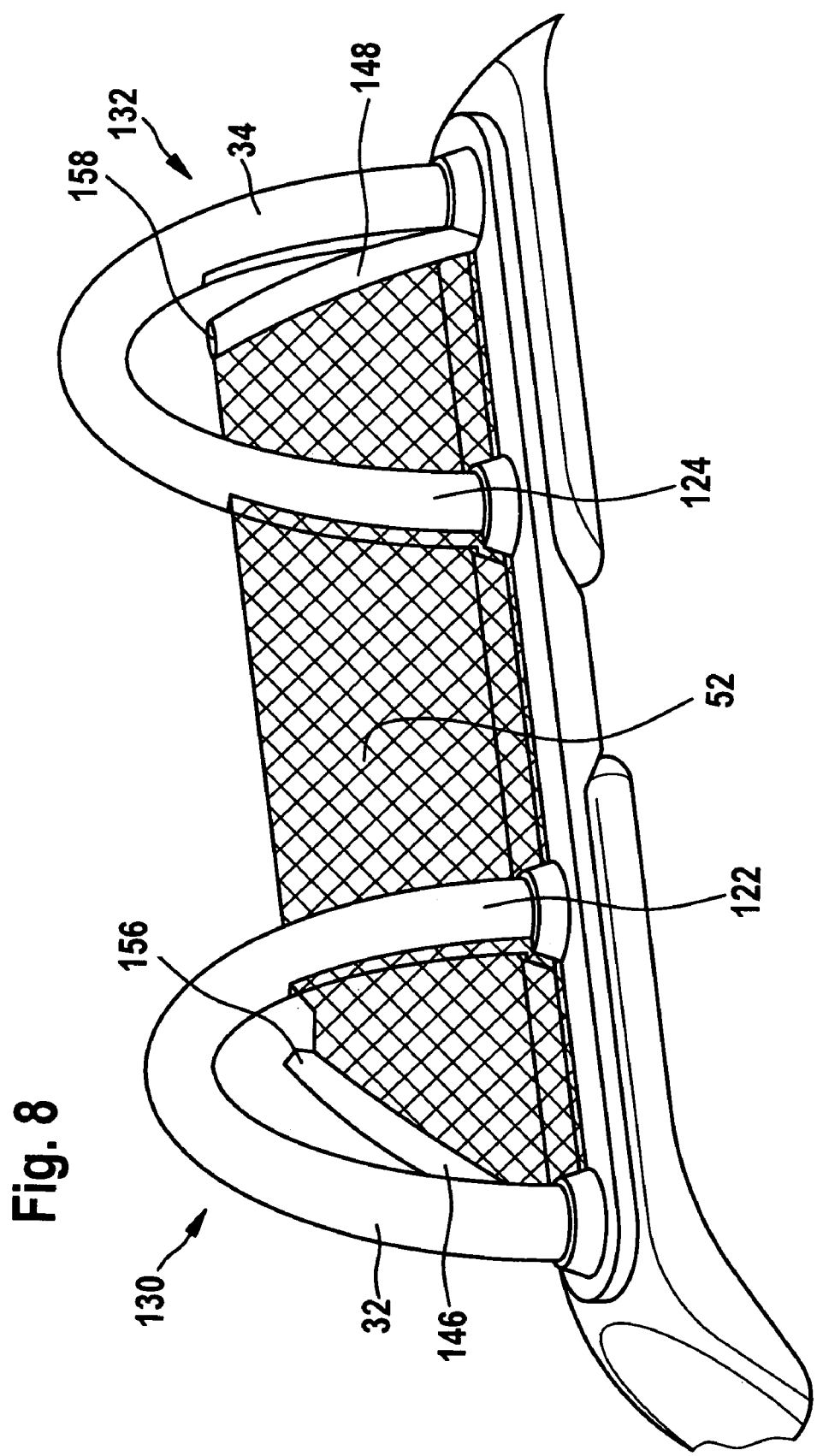
FIG. 8 shows an illustration of an intermediate position of the wind-deflecting flat material between the active position and the stowing position.

As illustrated in FIGS. 6 to 8, all the free spaces 134, 136 and 138 of the roll-over protection device 30' can be covered by a flat material 52 when this is in its active position.

For this purpose, the flat material 52, as illustrated in FIGS. 6 and 7, is held tensioned between the outer uprights 32, 34 in the active position by arms 146, 148 which abut on inner sides 142 and 144 of the outer uprights 32, 34 facing the inner uprights 122, 124 in the active position, wherein the inner uprights 122 and 124 are provided for this purpose with transverse openings 152, 154 which pass through them completely in a transverse direction 150 between the outer uprights 32, 34 and extend, proceeding from the exit opening 64 in the upper side 36 of the vehicle body 10, as far as the cross bars 126, 128 so that, as a result, the inner supports 122 and 124 extend altogether in two parts from the exit opening 64 as far as the cross bars 126, 128 and, therefore, in this embodiment, as well, the flat material 52 is located in the active position in the surface F which extends transversely to the longitudinal direction 14 of the vehicle and intersects the outer uprights 32 and 34 and, in this embodiment, also the inner uprights 122 and 124.

The arms 146 and 148 are designed such that their upper ends 156, 158 hold the flat material 52 in the active position so as to be tensioned such that an upper edge 160 of the flat material 52 extends essentially straight, tensioned between the uprights 32 and 34.

Figure 9:
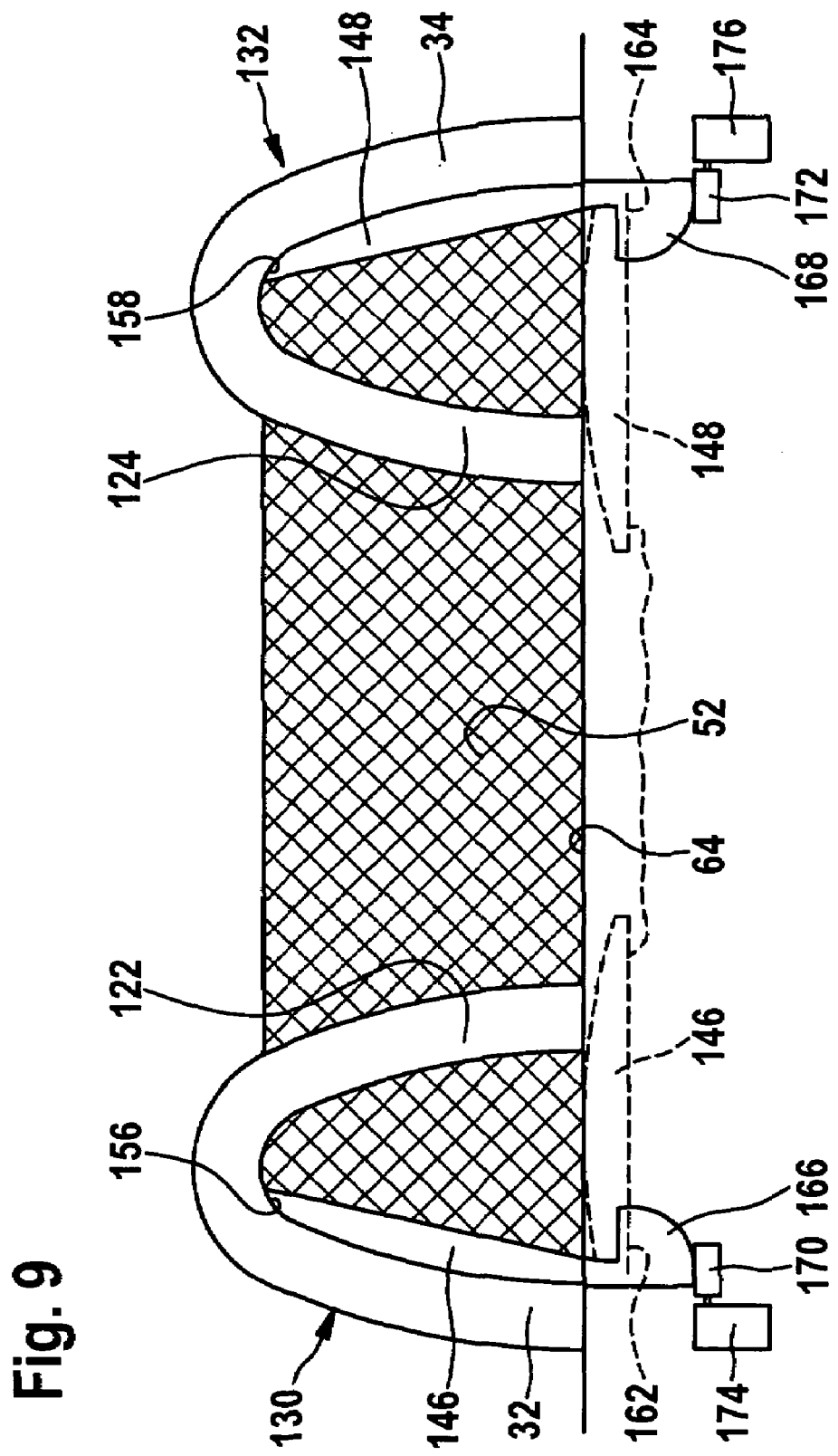
FIG. 9 shows a schematic illustration of arms of the flat material guiding device not only in active position (with solid lines) but also in stowing position (with dashed lines)

As illustrated in FIGS. 8 and 9, the arms 146 and 148 are each mounted so as to be pivotably about pivot axes 162 and 164 which extend approximately parallel to the longitudinal direction 14 of the vehicle, namely in such a manner that their ends 156, 158 can be moved in the direction of the exit opening 64 and can be moved through this in order to reach the stowing position of the arms 146, 148 which is illustrated in FIG. 9 by dashed lines and in which they no longer protrude beyond the exit opening 64 but are located within the stowing receiving means 62.

As a result, in order to reach the stowing position the flat material 52 held on the arms 146 and 148 is also moved through the exit opening 64 into the stowing receiving means 62 and wound to form a wound package 96 by means of a drawing-in device 90 provided, for example, in the stowing receiving means 62 and designed, for example, as a winding device, as described in conjunction with the first embodiment.

In this embodiment, the outlet opening 64 preferably has such a width that the arms 146, 148 can be moved through it, wherein the exit opening 64 can be closed, for example, by elastic lips.

In order to pivot the arms 146 and 148, these are preferably provided with gear wheel segments 166 and 168 which are arranged in the area of the stowing receiving means 62, can be pivoted about the pivot axes 162 and 164 together with the arms 146 and 148 and are each in engagement, for example, with drive worm gears 170 and 172, wherein the drive worm gears 170 and 172 can be driven by drive units 174 and 176 which either represent individual electric motors or can be driven by a drive motor coupled to one another in order to pivot the arms 146, 148 back and forth between the active position and the stowing position and vice versa.

Figure 10:
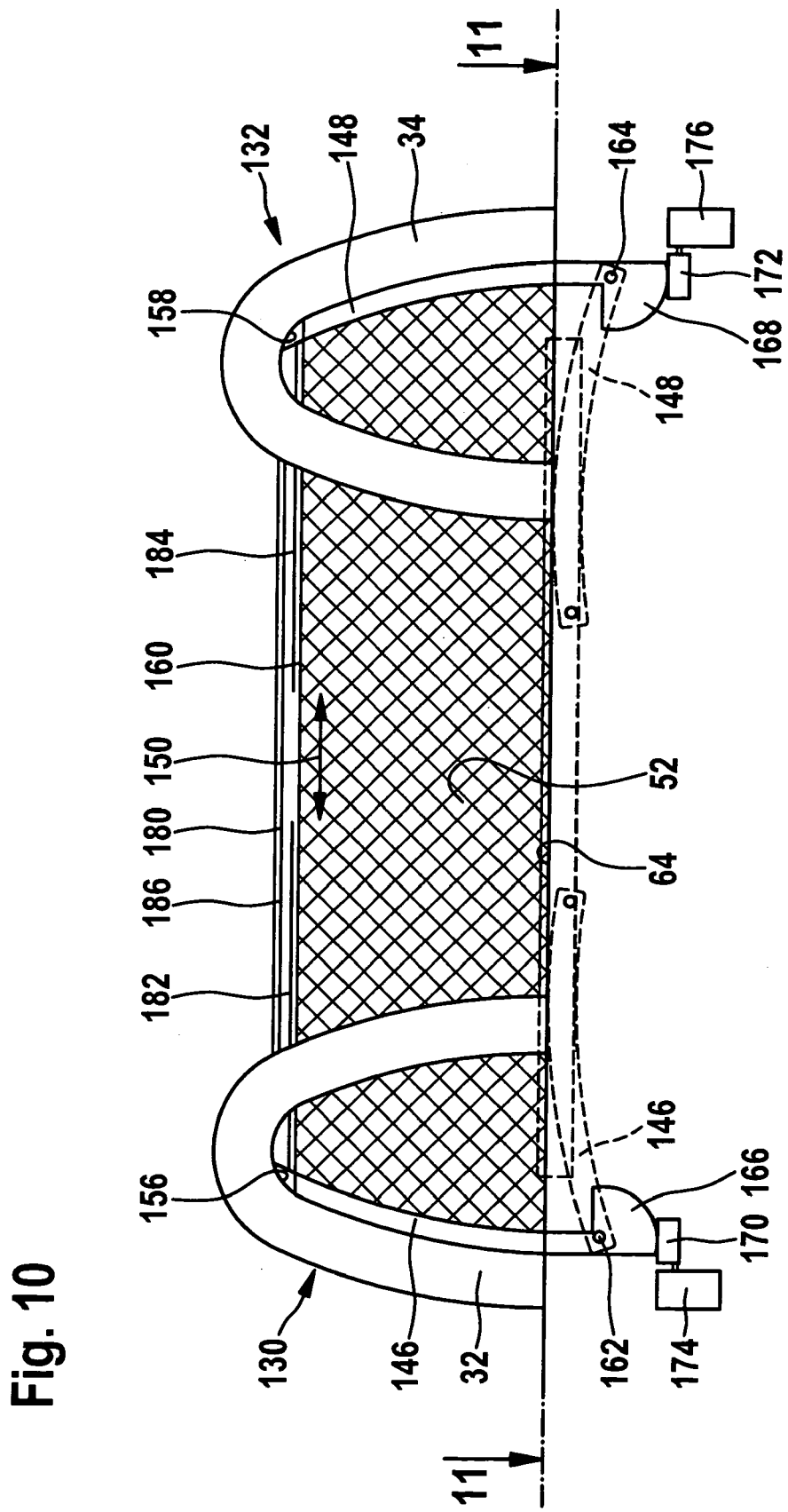
FIG. 10 shows an illustration similar to FIG. 9 of a third embodiment of the inventive convertible vehicle.
Figure 11:
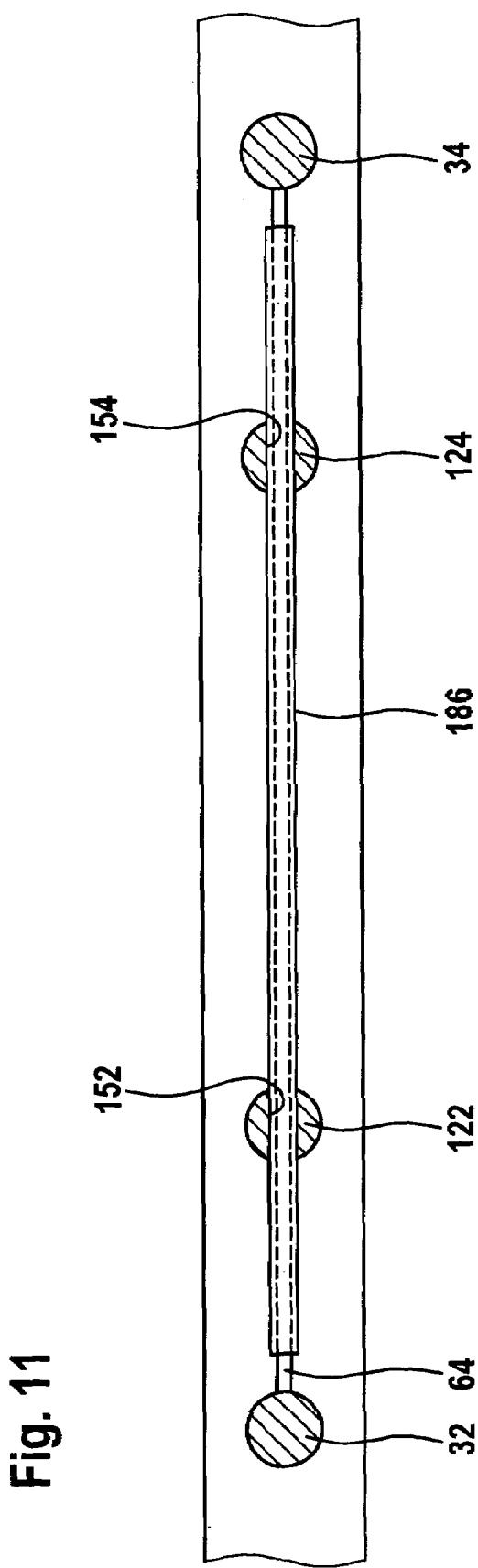
FIG. 11 shows a section along line 11—11 in FIG. 10.

A third embodiment of the inventive solution, illustrated in FIGS. 10 and 11, corresponds in principle to the second embodiment, with the difference that the flat material 52 is held in the area of the upper edge 160 by an edge rail 180 which extends in the transverse direction 150 between the outer uprights 132 and 134 and on which the arms 146, 148 engage with their ends 156, 158, wherein the ends 156 and 158 can be moved along the edge rail 180 in guide means 182, 184 provided at the edge rail 180.

A pivoting of the arms 146 and 148 leads to the entire edge rail 180 being moved in the direction of the exit opening 64, wherein the ends 156, 158 of the arms 146 and 148 move in the guide means 182 and 184 and run towards one another. As a result, the edge rail 180 may be moved towards the exit opening 64 aligned essentially parallel to it.

Furthermore, the edge rail 180 is provided on its side facing away from the vehicle body 10 with a cover 186, with which the exit opening 64 can be covered in the stowing position of the arms 146, 148.

In this case, the transverse openings 152 and 154 of the inner uprights 122 and 124 have to be designed such that the edge rail 180, together with the cover 186 and the arms 146, 148 guided on the edge rail 180, may be moved through the transverse openings 152, 154.

As a result, the exit opening 64 may be closed in a simple manner by the edge rail 180, in particular, with the cover 186 when the arms 146, 148 are located in their stowing position within the stowing receiving means 62.

As for the rest, the arms 146 and 148 may be driven in the same way as in the second embodiment in order to pivot about the pivot axes 162 and 164.

Figure 12:
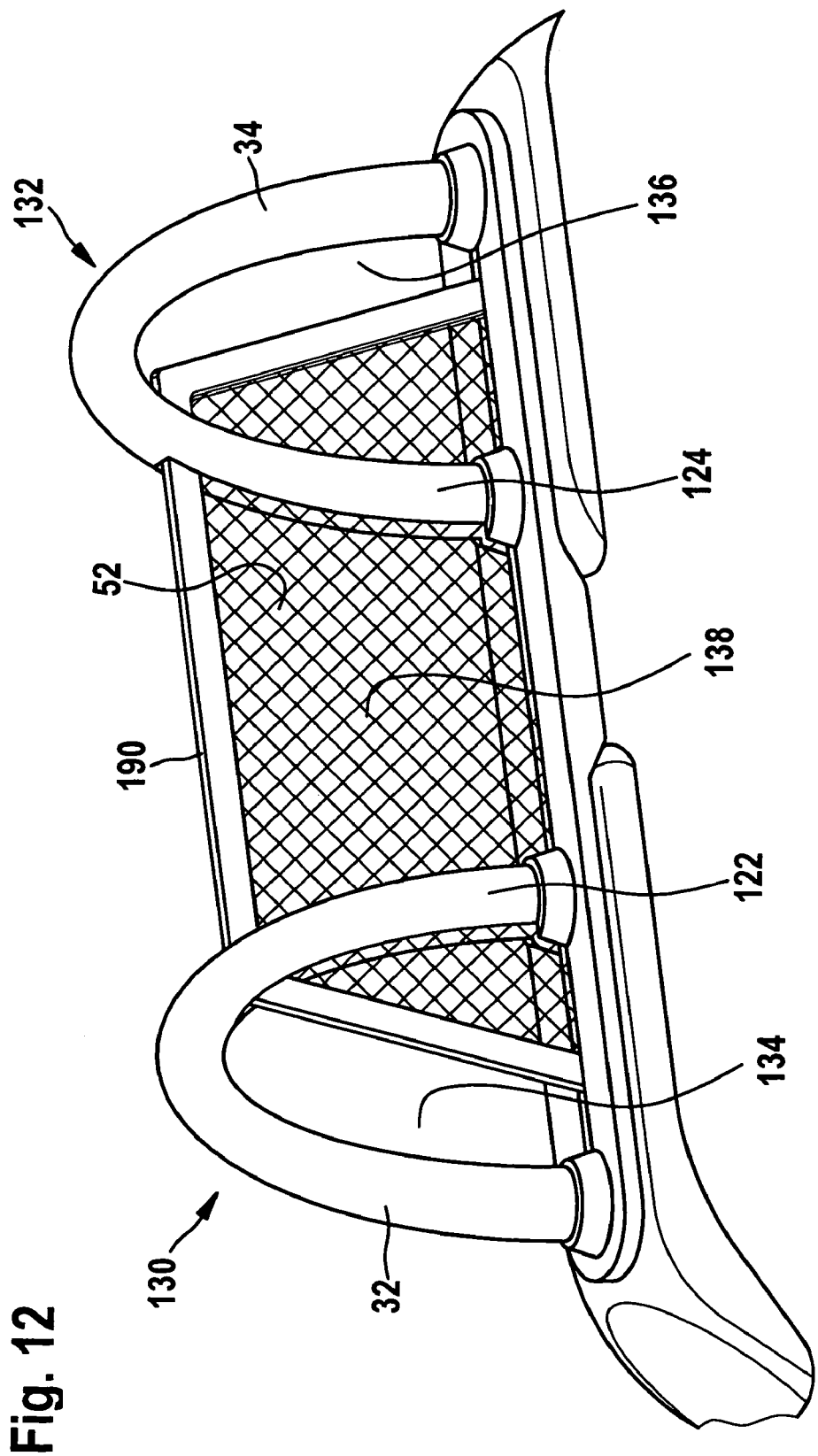
FIG. 12 shows an illustration similar to FIG. 6 of a fourth embodiment of the inventive convertible vehicle with roll-over protection device and wind stop device.
Figure 13:
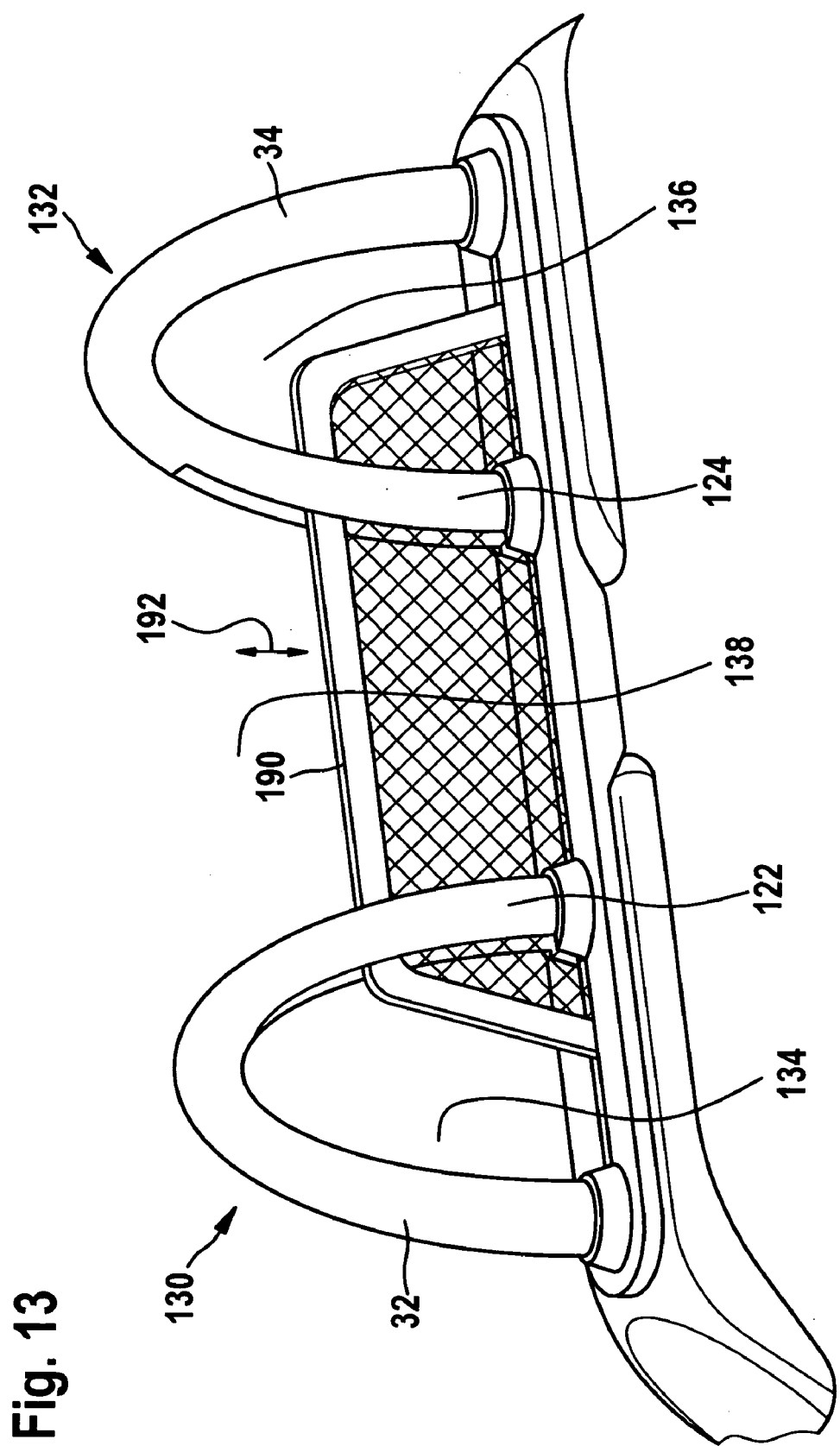
FIG. 13 shows an illustration similar to FIG. 8 with a frame of a flat material guiding device located between the active position and the stowing position.

In a fourth embodiment, illustrated schematically in FIGS. 12 and 13, those elements which are identical to the preceding embodiments are given the same reference numerals and so with respect to the description thereof reference can be made in full to the explanations concerning the preceding embodiments.

Figure 14:
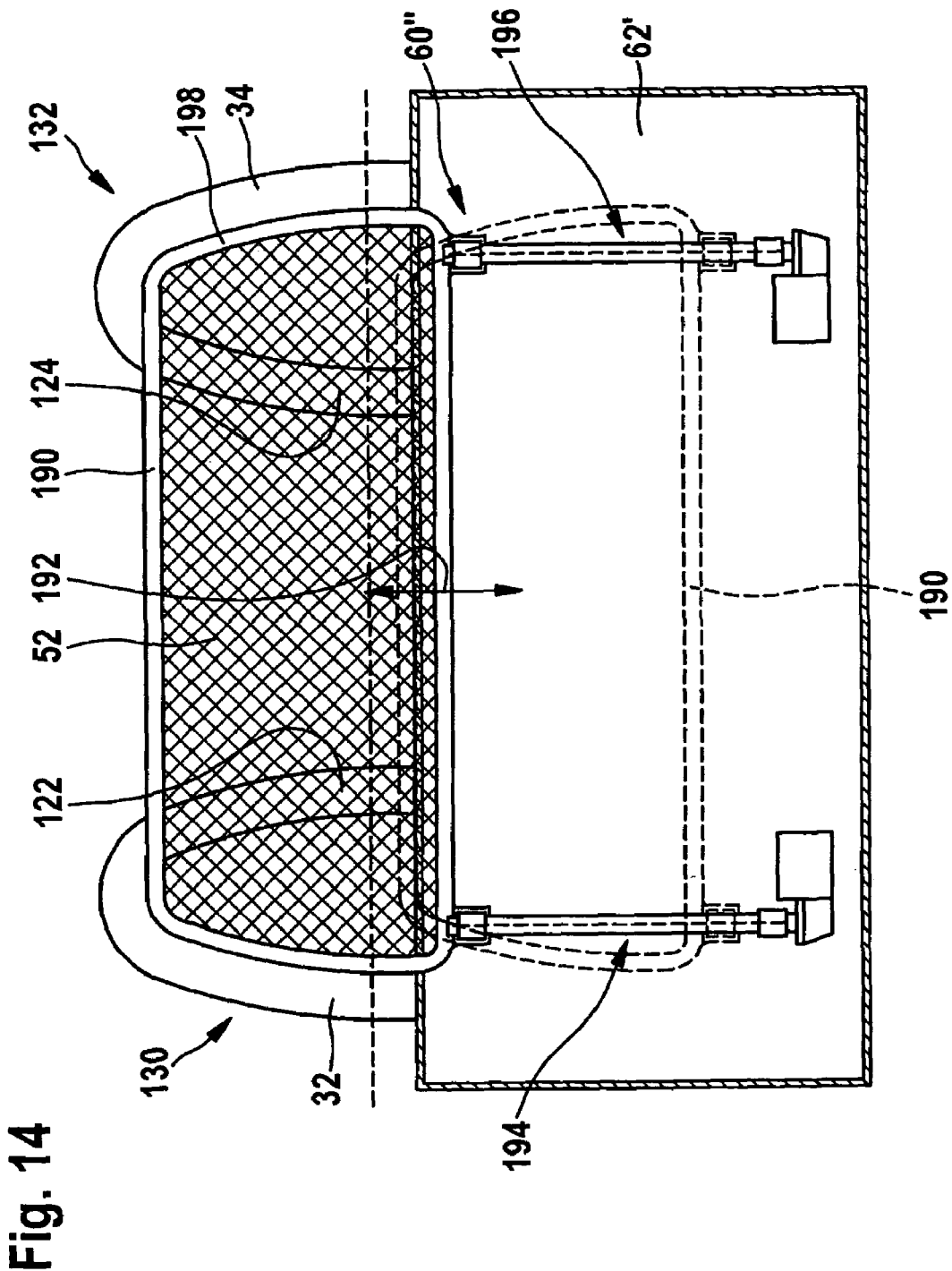
FIG. 14 shows an illustration similar to FIG. 9 of the frame of the flat material guiding device in the active position (with solid lines) and the stowing position (with dashed lines)

In the fourth embodiment, the flat material is, in contrast to the preceding embodiments and as illustrated schematically in FIG. 14, held tensioned in a frame 190 which is inherently rigid, encloses the flat material 52 semilaterally and can be moved in an undeformed manner between the active position illustrated in FIG. 14 by solid lines and the stowing position illustrated in FIG. 14 by dashed lines and vice versa.

The frame 190 is part of the flat material guiding device 60 which allows the movement of the flat material 52 and, in addition to the frame 190, comprises linear drives 194, 196 moving this in a direction of displacement 192, as described, for example, in German patent application DE 199 02 242 A1.

As illustrated in FIG. 14, the frame 190 can be formed merely by an outer frame 198 which encloses the flat material 52 on the outer side.

Figure 15:
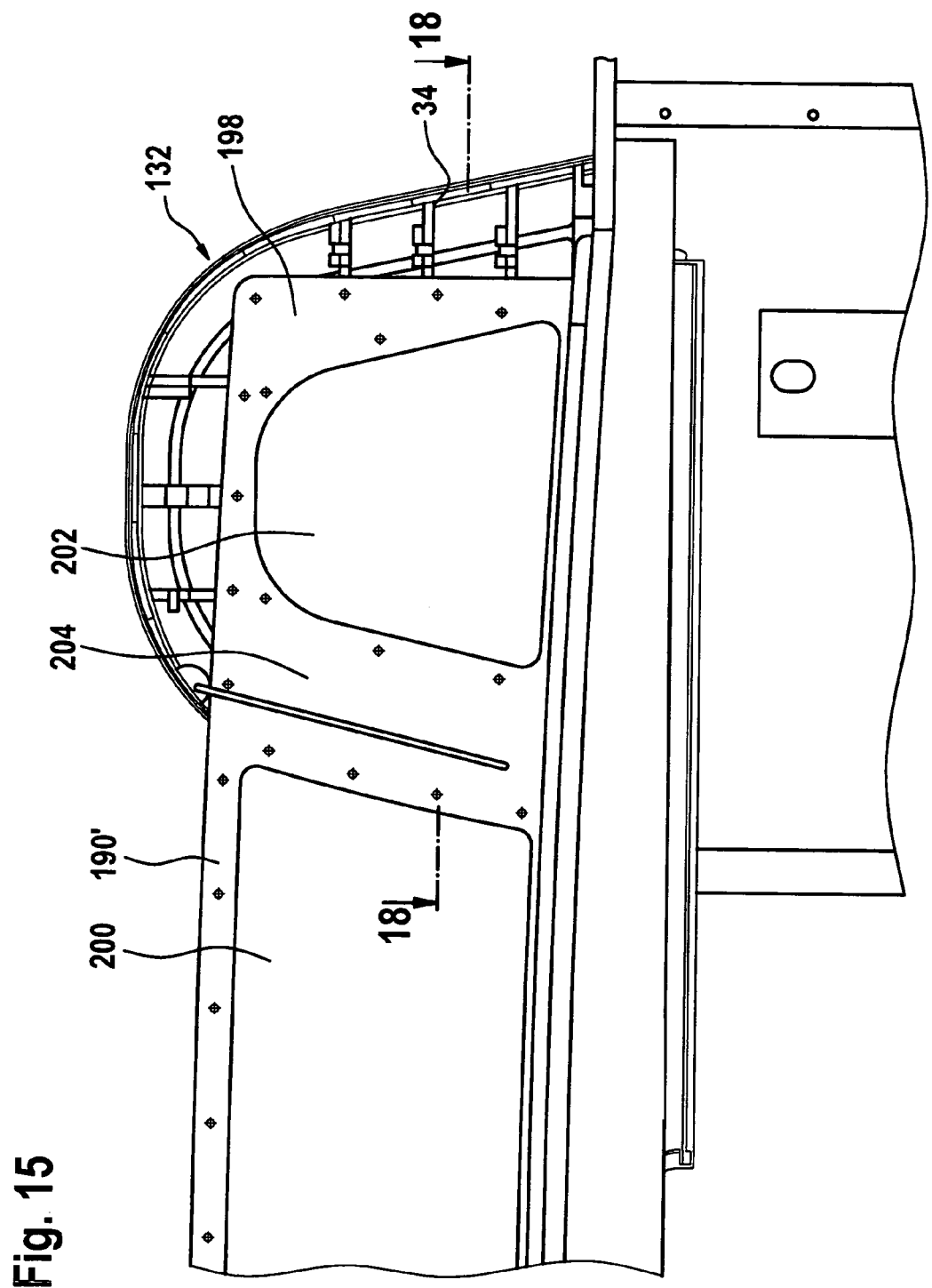
FIG. 15 shows a sectional illustration along line 15—15 in FIG. 17 in a fifth embodiment of an inventive convertible vehicle with roll-over protection device and wind stop device with a frame located in active position.
Figure 16:
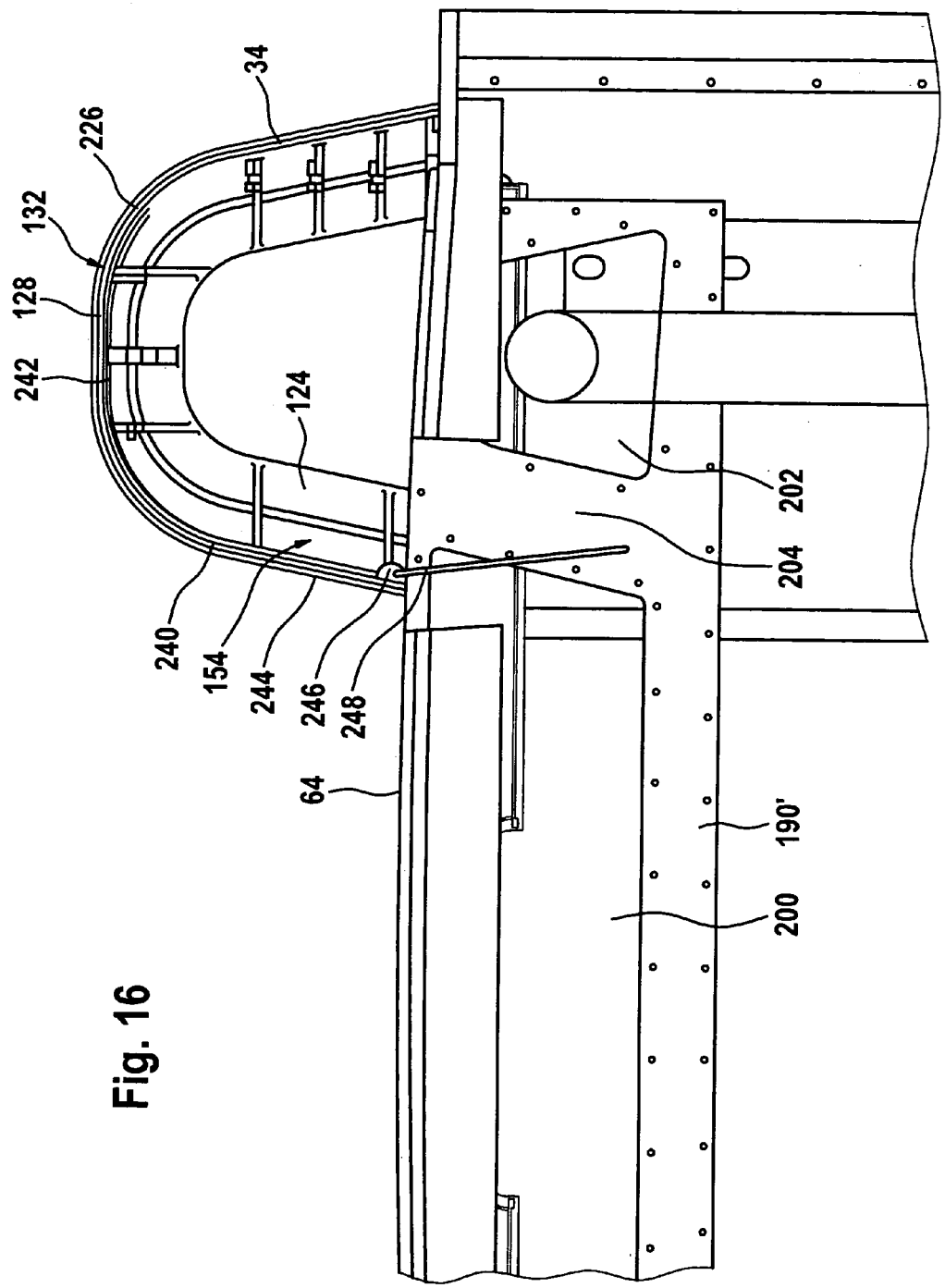
FIG. 16 shows an illustration similar to FIG. 15 with a frame located in stowing position.

In a fifth embodiment, illustrated in FIGS. 15 and 16, it is provided for the frame 190' to have several openings, for example, a central opening 200 and outer openings 202 which result due to the fact that the outer frame 198 is subdivided in addition by intermediate webs 204. The outer openings 202 are arranged such that they are located in the area of the free spaces 134 and 136 of the roll-over protection elements 130 and 132 and the central opening 200 is arranged such that it is located in the area of the free space 138 between the roll-over protection elements 130 and 132.

The frame 190' is preferably formed by two plates 210 and 212, between which the flat material 52 is clamped so that this extends over the openings 200 and 202 of the frame 190'.

Figure 17:
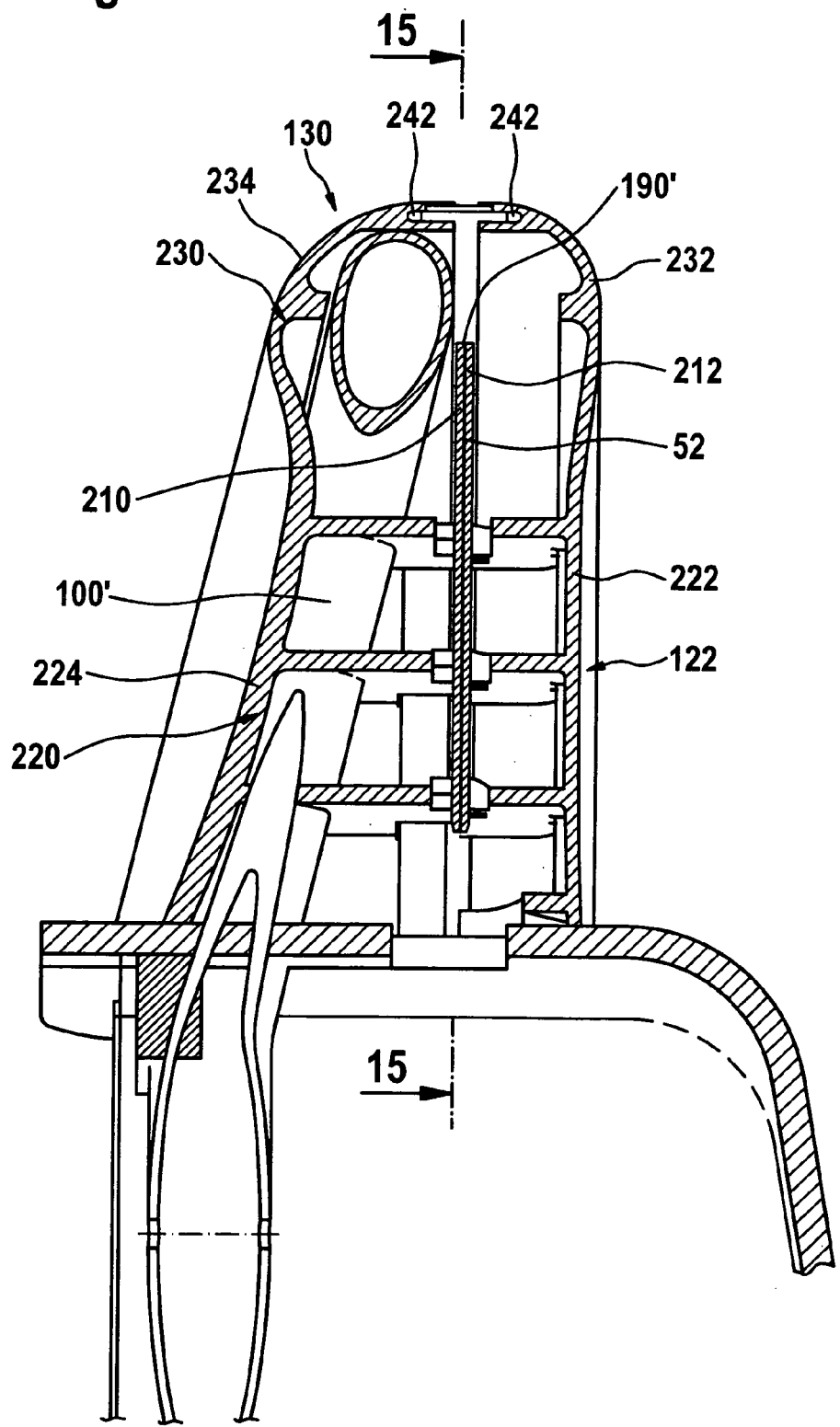
FIG. 17 shows a section along line 17—17 in FIG. 18.
Figure 18:
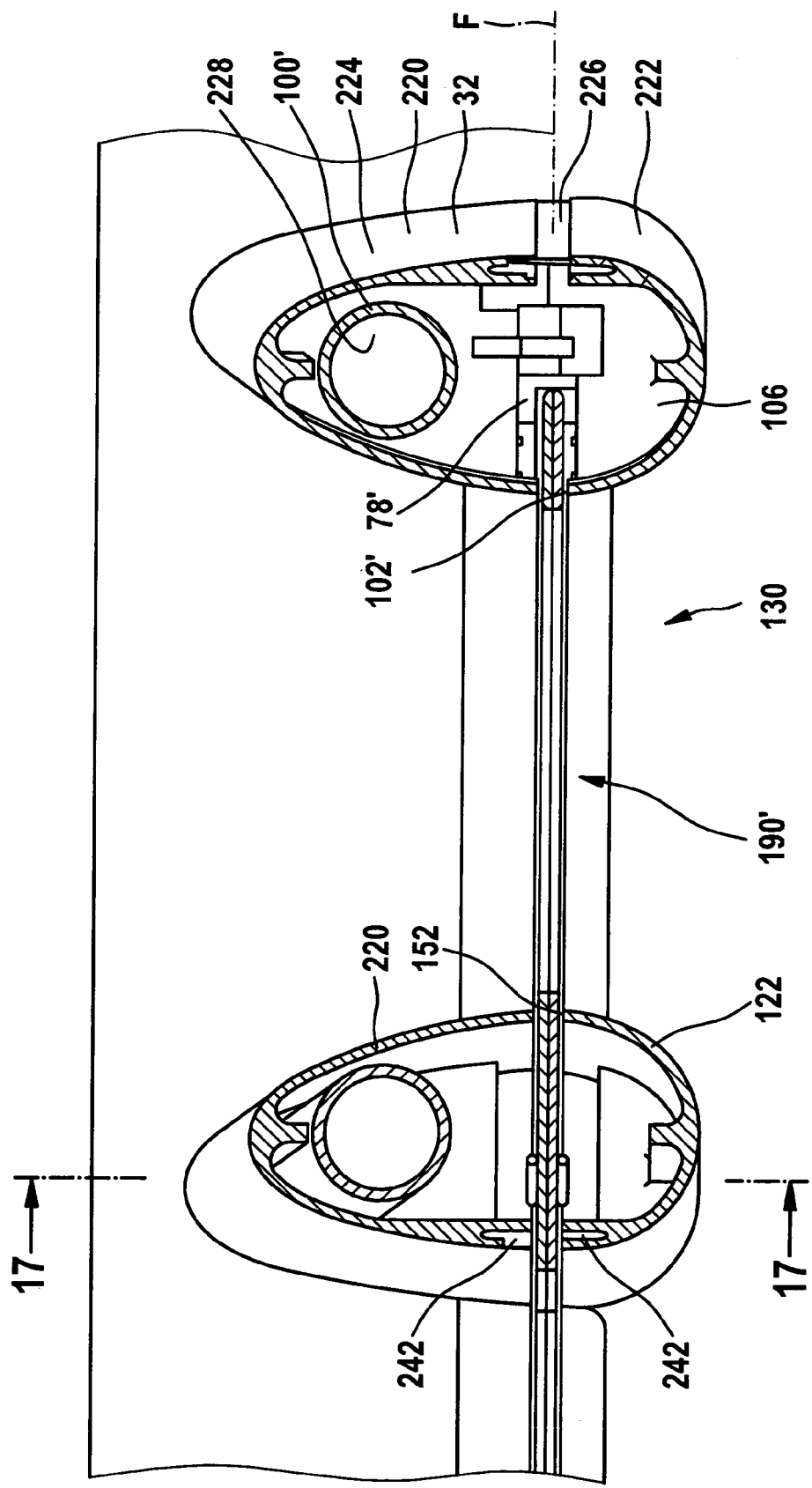
FIG. 18 shows a section along line 18—18 in FIG. 15.

In the fifth embodiment, as illustrated in FIGS. 17 and 18, the roll-over protection elements 130 and 132 are, in addition, designed, as illustrated by way of the example of the roll-over protection element 130, such that an outer contour of the uprights 32, 34, 122 and 124 as well as the cross bars 126 and 128 is not determined by the support structure.

In the fifth embodiment, an outer contour of the uprights 32, 34, 122, 124, illustrated by way of the example of the roll-over protection element 130, is formed by an outer housing 220 which has, for example, a forward housing section 222 located in front of the surface F in the direction of travel 12 and a rear housing section 224 located behind the surface F in the direction of travel 12, these housing sections forming, in the case of the outer uprights 32, 34, the opening 102' which is located on their sides facing one another and via which, in the fifth embodiment, the frame 190' can engage in the interior 106' of the outer uprights 32, 34 in order to engage in the guide rail 78' arranged in the interior 106' on the outer side. Furthermore, the housing sections 222 and 224 are connected to one another by a connecting element 226 on the sides of the outer uprights 32, 34 located opposite the openings 102'.

In the case of the inner uprights 122, 124, the transverse opening 152 is formed between the respective housing sections 222 and 224 so that the housing sections 222, 224 are not connected to one another in the area of the inner uprights 122, 124 but rather border on the respective transverse opening 152.

The support structure 100' extends separately from the upright housing 220 in the interior 106' thereof and is completely independent of the upright housing 220 which, for its part, does not contribute anything to the stability of the support structure 100'. In this respect, the support structure 100' is preferably formed by an inversely U-shaped tubular bracket 228 which extends in the interior 106' of the uprights 32, 34, 122, 124 and also of the cross bars 126 and 128.

In this respect, the upright housing 220 merges in one piece into a corresponding transverse support housing 230 and the interior 106' carries on in the transverse support housing 230 continuously from the upright housing 220 so that the inversely U-shaped tubular bracket 228 can extend in the interior 106' as a continuous part, wherein the transverse support housing 230 connected in one piece to the upright housing 220 is likewise formed by a forward housing section 232 and a rear housing section 234 which are both integrally formed on the corresponding housing sections 222, 224 of the upright housing 220.

In order to close the transverse openings 152 and 154, a flexible cover strip 240 is, as illustrated in FIGS. 15 and 16 with the example of the roll-over protection element 132, guided between the housing sections 222 and 224 for displacement in guide means 242 extending along an outer contour of the housing sections 222 and 232 as well as 224 and 234, wherein the guide means 242 extend on an inner side facing the interior 106' of the connecting element 226 provided between the housing sections 222, 232 and 224, 234 in the area of the outer uprights 32, 34 and the cross bars 126, 128 so that the cover strip 240 is located on the inner side of the connecting element 226 in the interior 106' in the active position of the flat material 52 and in the stowing position of the flat material 52 closes the transverse openings 152, 154 in the area of sides 244 of the inner uprights 122, 124 which face one another.

For this purpose, the cover strip 240 is provided on its end facing the frame 190' with a bearing head 246, in which an actuating rod 248 engages which, for its part, engages on the intermediate web 204 of the frame 190', namely in an area facing away from the guiding head 246, wherein the guiding rod 248 therefore extends in the interior 106' of the upright housing 220 of the inner uprights 122, 124.

If the frame 190' is moved into the active position, the flexible cover strip 240 is moved via the guide means 242 on the inner side of the connecting element 226 into the interior 106' of the cross bar housing 230 and of the upright housing 220 of the outer upright 32 and the frame 190' can move into the corresponding transverse opening 152, 154.

If the frame 190' is moved from the active position into the stowing position, the actuating rod 248 pulls on the bearing head 246 of the flexible cover strip 240 and draws this in the guide means 242 in the direction of the exit opening 64 so that, as a result, the transverse opening 152, 154 is closed at the respective inner side 244 of the corresponding inner upright 122, 124.

Figure 19:
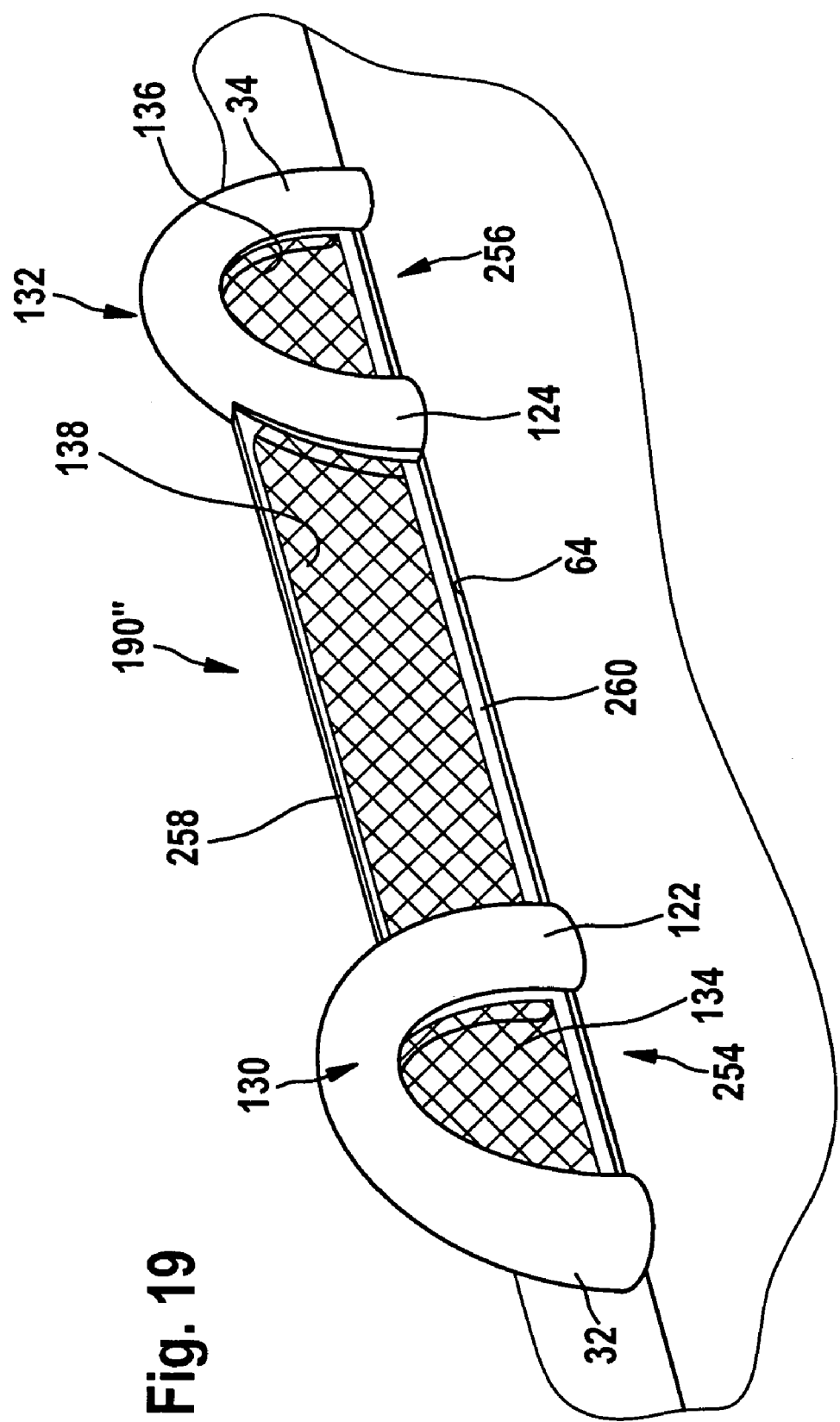
FIG. 19 shows an illustration similar to FIG. 6 of a sixth embodiment of the inventive convertible vehicle with roll-over protection device and wind stop device in the active position of the flat material guiding device and FIG. 20 shows an illustration of the fifth embodiment corresponding to FIG. 19 with a flat material guiding device located in the stowing position.
Figure 20:
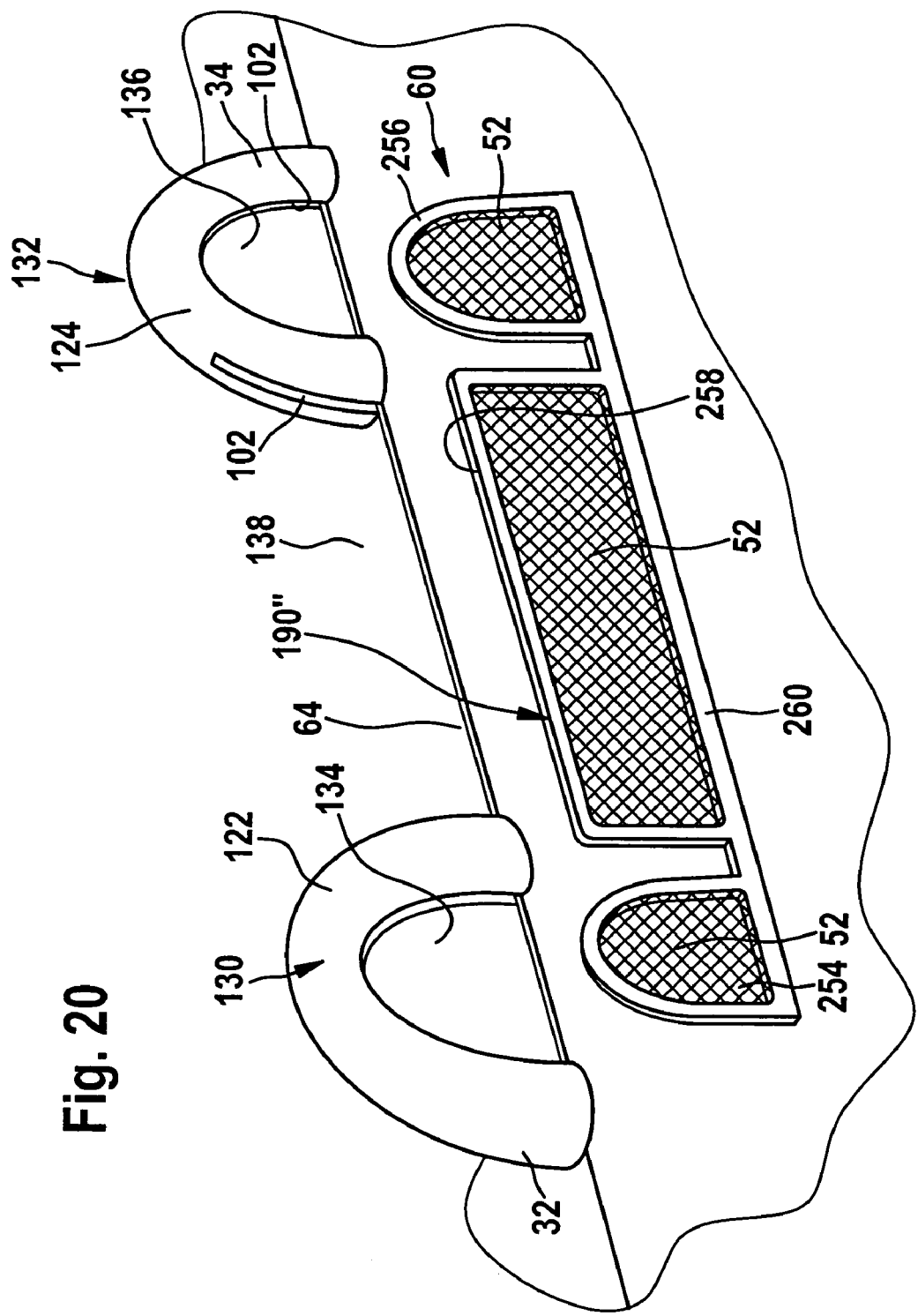

In a sixth embodiment, illustrated in FIGS. 19 and 20, those elements which are identical to those of the preceding embodiments are given the same reference numerals and so for the description thereof reference can be made in full to the explanations concerning the preceding embodiments.

In contrast to the fifth embodiment, the frame 190" is designed such that it has altogether three partial frames, namely the partial frames 254 and 256 which can be moved into the free spaces 134 and 136 in order to close these in a wind inhibiting manner as well as the partial frame 258 which is provided for the purpose of closing the free space 138 between the roll-over protection elements 130 and 132.

The partial frames 254, 256 and 258 are seated on a common support 260 which can be moved by linear drives 194 and 196, as described, for example, in the fourth embodiment, in order to move the entire frame 190" from the active position illustrated in FIG. 19 into the stowing position illustrated in FIG. 20 and vice versa.

Each of these partial frames 254, 256, 258 tensions a piece of flat material 52 which is provided for this partial frame and is designed in the same way as that described in the preceding embodiments.

The sixth embodiment is preferably designed such that the outer uprights 32, 34 as well as the inner uprights 122, 124 are provided with receiving means for the flat material guiding device 60, for example, with openings 102 leading into the respective interior which serve to guide the partial frames 254, 256 and 258 in the active position relative to the uprights 32, 34, 122, 124 and keep them in their position.

It is, however, also conceivable to provide the frame 190" with such stability that the support 260, in particular, positions the partial frames 254, 256 and 258 exactly in such a manner that openings 102 are not required in all the uprights 32, 34, 122, 124 but rather only in some of the uprights, for example, in the inner uprights 122, 124.

In the sixth embodiment, it is, therefore, not absolutely necessary for the inner uprights 122, 124 to be provided with transverse openings. On the contrary, it is sufficient to provide openings 102 which are arranged so as to face the respective free spaces 134, 136 and 138 but not pass through the inner uprights 122 and 124 completely in the transverse direction.

In a further variation, it is even conceivable to give the frame 190" such stability that an opening 102 for fixing the partial frames 254, 256, 258 in the active position is not required in any of the uprights 32, 34, 122, 124. For example, it would be sufficient to have the partial frames 254, 256 and 258 merely abutting in a frictional manner on the roll-over protection elements 130, 132.

As for the rest, reference is made in full to the explanations concerning the preceding embodiments with respect to additional details.

The invention claimed is:

1. Convertible vehicle comprising:
   a vehicle body with a passenger compartment,
   at least one row of seats arranged in the passenger compartment,
   a roll-over protection device arranged behind the at least one row of seats and having at least one free space facing a rear of the vehicle body, said protection device having at least two uprights arranged transversely to a longitudinal direction of the vehicle body at a distance from one another and rising above the vehicle body and at least one cross bar extending between said at least two uprights,
   a wind stop device arranged behind the at least one row of seats, said wind stop device reducing a flow of air through the at least one free space of the roll-over protection device,
   the wind stop device having a flat material guiding device and a wind-deflecting flat material held by the flat material guiding device, the flat material guiding device holding the wind-deflecting flat material in an active position in a surface intersecting the uprights and thereby closing the at least one free space in a wind inhibiting manner, and the wind-deflecting flat material being adapted to be brought by means of the flat material guiding device from the active position into a stowing position located in the vehicle body and vice versa,
   a stowing receiving means provided in the vehicle body for accommodating the wind-deflecting flat material in the stowing position, said stowing receiving means being arranged adjacent to the roll-over protection device and having an exit opening for the wind-deflecting flat material facing the roll-over protection device, and the surface, in which the wind-deflecting flat material extends in the active position, passing through the exit opening.

2. Convertible vehicle as defined in claim 1, wherein the flat material guiding device is provided with a drive in order to move the wind-deflecting flat material between the active position and the stowing position and vice versa.

3. Convertible vehicle comprising:
a vehicle body with a passenger compartment,
at least one row of seats arranged in the passenger compartment,
a roll-over protection device arranged behind the at least one row of seats and having at least one free space facing a rear of the vehicle body, said protection device having at least two uprights arranged transversely to a longitudinal direction of the vehicle body at a distance from one another and rising above the vehicle body and at least one cross bar extending between said at least two uprights,
a wind stop device arranged behind the at least one row of seats, said wind stop device reducing a flow of air through the at least one free space of the roll-over protection device,
the wind stop device having a flat material guiding device and a wind-deflecting flat material held by the flat material guiding device, the flat material guiding device holding the wind-deflecting flat material in an active position in a surface intersecting the uprights and thereby closing the at least one free space in a wind inhibiting manner, and the wind-deflecting flat material being adapted to be brought by means of the flat material guiding device from the active position into a stowing position located in the vehicle body and vice versa, and
the flat material guiding device comprising a closure element for the exit opening.

4. Convertible vehicle as defined in claim 3, wherein a stowing receiving means for accommodating the wind-deflecting flat material in the stowing position is provided in the vehicle body, said receiving means being arranged adjacent to the roll-over protection device.

5. Convertible vehicle as defined in claim 4, wherein the stowing receiving means has an exit opening for the wind-deflecting flat material facing the roll-over protection device.

6. Convertible vehicle as defined in claim 5, wherein the surface, in which the wind-deflecting flat material extends in the active position, passes through the exit opening.

7. Convertible vehicle as defined in claim 1, wherein the wind-deflecting flat material is a slack material not resistant to bending.

8. Convertible vehicle as defined in claim 7, wherein the flat material guiding device comprises a tensioning device for tensioning the wind-deflecting flat material over the free space in the active position.

9. Convertible vehicle comprising:
a vehicle body with a passenger compartment,
at least one row of seats arranged in the passenger compartment,
a roll-over protection device arranged behind the at least one row of seats and having at least one free space facing a rear of the vehicle body, said protection device having at least two uprights arranged transversely to a longitudinal direction of the vehicle body at a distance from one another and rising above the vehicle body and at least one cross bar extending between said at least two uprights,
a wind stop device arranged behind the at least one row of seats, said wind stop device reducing a flow of air through the at least one free space of the roll-over protection device,
the wind stop device having a flat material guiding device and a wind-deflecting flat material held by the flat material guiding device, the flat material guiding device holding the wind-deflecting flat material in an active position in a surface intersecting the uprights and thereby closing the at least one free space in a wind inhibiting manner, and the wind-deflecting flat material being adapted to be brought by means of the flat material guiding device from the active position into a stowing position located in the vehicle body and vice versa,
the wind-deflecting flat material being a slack material not resistant to bending,
the flat material guiding device comprising a tensioning device for tensioning the wind-deflecting flat material over the free space in the active position, and
the tensioning device comprising a bracket movable in a guide means for keeping the wind-deflecting flat material tensioned in a transverse direction.

10. Convertible vehicle as defined in claim 9, wherein the tensioning device has two arms pivotable between an active position and a stowing position, said arms keeping the wind-deflecting flat material tensioned in the transverse direction in the active position.

11. Convertible vehicle as defined in claim 10, wherein:
the arms are mounted to be pivotable close to the uprights limiting a respective, at least one free space on an outer side; and
the arms extend approximately parallel to the uprights in the active position.

12. Convertible vehicle as defined in claim 10, wherein the arms extend transversely to the uprights in the stowing position.

13. Convertible vehicle comprising:
a vehicle body with a passenger compartment,
at least one row of seats arranged in the passenger compartment,
a roll-over protection device arranged behind the at least one row of seats and having at least one free space facing a rear of the vehicle body, said protection device having at least two uprights arranged transversely to a longitudinal direction of the vehicle body at a distance from one another and rising above the vehicle body and at least one cross bar extending between said at least two uprights,
a wind stop device arranged behind the at least one row of seats, said wind stop device reducing a flow of air through the at least one free space of the roll-over protection device,
the wind stop device having a flat material guiding device and a wind-deflecting flat material held by the flat material guiding device, the flat material guiding device holding the wind-deflecting flat material in an active position in a surface intersecting the uprights and thereby closing the at least one free space in a wind inhibiting manner, and the wind-deflecting flat material being adapted to be brought by means of the flat material guiding device from the active position into a stowing position located in the vehicle body and vice versa, the wind-deflecting flat material being a slack material not resistant to bending, and the flat material guiding device comprising:
a tensioning device for tensioning the wind-deflecting flat material over the free space in the active position, and
a drawing in device arranged in the vehicle body for moving the wind-deflecting flat material into the stowing position.

14. Convertible vehicle as defined in claim 13, wherein the drawing-in device comprises a winding device for the wind-deflecting flat material.

15. Convertible vehicle as defined in claim 1, wherein the flat material guiding device comprises a frame accommodating the wind-deflecting flat material and a displacing device for the movement of the frame between a stowing position and an active position.

16. Convertible vehicle as defined in claim 15, wherein the frame is arranged in the stowing position so as to extend in the vehicle body due to the displacing device.

17. Convertible vehicle as defined in claim 16, wherein the frame is located in the stowing position in a surface extending transversely to the longitudinal direction of the vehicle body.

18. Convertible vehicle as defined in claim 15, wherein the flat material guiding device has a one-part frame for holding the flat material.

19. Convertible vehicle as defined in claim 18, wherein the frame positions the flat material in all the free spaces so as to be wind inhibiting in the active position of the flat material guiding device.

20. Convertible vehicle comprising:
a vehicle body with a passenger compartment,
at least one row of seats arranged in the passenger compartment,
a roll-over protection device arranged behind the at least one row of seats and having at least one free space facing a rear of the vehicle body, said protection device having at least two uprights arranged transversely to a longitudinal direction of the vehicle body at a distance from one another and rising above the vehicle body and at least one cross bar extending between said at least two uprights,
a wind stop device arranged behind the at least one row of seats, said wind stop device reducing a flow of air through the at least one free space of the roll-over protection device,
the wind stop device having a flat material guiding device and a wind-deflecting flat material held by the flat material guiding device, the flat material guiding device holding the wind-deflecting flat material in an active position in a surface intersecting the uprights and thereby closing the at least one free space in a wind inhibiting manner, and the wind-deflecting flat material being adapted to be brought by means of the flat material guiding device from the active position into a stowing position located in the vehicle body and vice versa, and
the flat material guiding device comprising a multipart frame accommodating the wind-deflecting flat material and a displacing device for the movement of the frame between a stowing position and an active position.

21. Convertible vehicle as defined in claim 20, wherein the multipart frame comprises several partial frames held by a common support.

22. Convertible vehicle as defined in claim 1, wherein the roll-over protection device comprises two outer uprights connected by the cross bar and arranged so as to face respective longitudinal sides of the vehicle body.

23. Convertible vehicle as defined in claim 22, wherein the roll-over protection device has a free space enclosed by the outer uprights and the cross bar.

24. Convertible vehicle comprising:
a vehicle body with a passenger compartment,
at least one row of seats arranged in the passenger compartment,
a roll-over protection device arranged behind the at least one row of seats and having at least one free space facing a rear of the vehicle body, said protection device having at least two uprights arranged transversely to a longitudinal direction of the vehicle body at a distance from one another and rising above the vehicle body and at least one cross bar extending between said at least two uprights,
a wind stop device arranged behind the at least one row of seats, said wind stop device reducing a flow of air through the at least one free space of the roll-over protection device,
the wind stop device having a flat material guiding device and a wind-deflecting flat material held by the flat material guiding device, the flat material guiding device holding the wind-deflecting flat material in an active position in a surface intersecting the uprights and thereby closing the at least one free space in a wind inhibiting manner, and the wind-deflecting flat material being adapted to be brought by means of the flat material guiding device from the active position into a stowing position located in the vehicle body and vice versa, and
the roll-over protection device comprising two roll-over protection elements, each of said elements having two uprights and a cross bar.

25. Convertible vehicle as defined in claim 24, wherein each of the roll-over protection elements has an outer upright arranged so as to face the respective longitudinal side of the vehicle body and an inner upright.

26. Convertible vehicle as defined in claim 24, wherein one of the free spaces of the roll-over protection device is located between the roll-over protection elements.

27. Convertible vehicle as defined in claim 24, wherein each of the roll-over protection elements has an additional free space surrounded by the uprights and the cross bars.

28. Convertible vehicle as defined in claim 1, wherein at least two of the uprights have at least one receiving means for the flat material guiding device.

29. Convertible vehicle comprising:
a vehicle body with a passenger compartment,
at least one row of seats arranged in the passenger compartment,
a roll-over protection device arranged behind the at least one row of seats and having at least one free space facing a rear of the vehicle body, said protection device having at least two uprights arranged transversely to a longitudinal direction of the vehicle body at a distance from one another and rising above the vehicle body and at least one cross bar extending between said at least two uprights, a wind stop device arranged behind the at least one row of seats, said wind stop device reducing a flow of air through the at least one free space of the roll-over protection device, the wind stop device having a flat material guiding device and a wind-deflecting flat material held by the flat material guiding device, the flat material guiding device holding the wind-deflecting flat material in an active position in a surface intersecting the uprights and thereby closing the at least one free space in a wind inhibiting manner, and the wind-deflecting flat material being adapted to be brought by means of the flat material guiding device from the active position into a stowing position located in the vehicle body and vice versa, and the outer uprights each having a receiving means for the flat material guiding device.

30. Convertible vehicle as defined in claim 28, wherein at least one inner upright has at least one receiving means.

31. Convertible vehicle as defined in claim 28, wherein at least one of the inner uprights has the wind-deflecting flat material located in the active position passing through it.

32. Convertible vehicle as defined in claim 31, wherein the inner uprights are provided with transverse openings, said openings having the wind-deflecting flat material located in the active position passing through them.

33. Convertible vehicle comprising:
a vehicle body with a passenger compartment,
at least one row of seats arranged in the passenger compartment,
a roll-over protection device arranged behind the at least one row of seats and having at least one free space facing a rear of the vehicle body, said protection device having at least two uprights arranged transversely to a longitudinal direction of the vehicle body at a distance from one another and rising above the vehicle body and at least one cross bar extending between said at least two uprights,
a wind stop device arranged behind the at least one row of seats, said wind stop device reducing a flow of air through the at least one free space of the roll-over protection device,
the wind stop device having a flat material guiding device and a wind-deflecting flat material held by the flat material guiding device, the flat material guiding device holding the wind-deflecting flat material in an active position in a surface intersecting the uprights and thereby closing the at least one free space in a wind inhibiting manner, and the wind-deflecting flat material being adapted to be brought by means of the flat material guiding device from the active position into a stowing position located in the vehicle body and vice versa, and
the uprights having an outer housing forming a support structure.

34. Convertible vehicle comprising:
a vehicle body with a passenger compartment,
at least one row of seats arranged in the passenger compartment,
a roll-over protection device arranged behind the at least one row of seats and having at least one free space facing a rear of the vehicle body, said protection device having at least two uprights arranged transversely to a longitudinal direction of the vehicle body at a distance from one another and rising above the vehicle body and at least one cross bar extending between said at least two uprights, a wind stop device arranged behind the at least one row of seats, said wind stop device reducing a flow of air through the at least one free space of the roll-over protection device, the wind stop device having a flat material guiding device and a wind-deflecting flat material held by the flat material guiding device, the flat material guiding device holding the wind-deflecting flat material in an active position in a surface intersecting the uprights and thereby closing the at least one free space in a wind inhibiting manner, and the wind-deflecting flat material being adapted to be brought by means of the flat material guiding device from the active position into a stowing position located in the vehicle body and vice versa, and the cross bars having an outer housing forming a support structure.

35. Convertible vehicle comprising:
a vehicle body with a passenger compartment,
at least one row of seats arranged in the passenger compartment,
a roll-over protection device arranged behind the at least one row of seats and having at least one free space facing a rear of the vehicle body, said protection device having at least two uprights arranged transversely to a longitudinal direction of the vehicle body at a distance from one another and rising above the vehicle body and at least one cross bar extending between said at least two uprights,
a wind stop device arranged behind the at least one row of seats, said wind stop device reducing a flow of air through the at least one free space of the roll-over protection device,
the wind stop device having a flat material guiding device and a wind-deflecting flat material held by the flat material guiding device, the flat material guiding device holding the wind-deflecting flat material in an active position in a surface intersecting the uprights and thereby closing the at least one free space in a wind inhibiting manner, and the wind-deflecting flat material being adapted to be brought by means of the flat material guiding device from the active position into a stowing position located in the vehicle body and vice versa, and
the uprights having an upright housing and a support structure extending in the upright housing.

36. Convertible vehicle comprising:
a vehicle body with a passenger compartment,
at least one row of seats arranged in the passenger compartment,
a roll-over protection device arranged behind the at least one row of seats and having at least one free space facing a rear of the vehicle body, said protection device having at least two uprights arranged transversely to a longitudinal direction of the vehicle body at a distance from one another and rising above the vehicle body and at least one cross bar extending between said at least two uprights,
a wind stop device arranged behind the at least one row of seats, said wind stop device reducing a flow of air through the at least one free space of the roll-over protection device,
the wind stop device having a flat material guiding device and a wind-deflecting flat material held by the flat material guiding device, the flat material guiding device holding the wind-deflecting flat material in an active position in a surface intersecting the uprights and thereby closing the at least one free space in a wind inhibiting manner, and the wind-deflecting flat material being adapted to be brought by means of the flat material guiding device from the active position into a stowing position located in the vehicle body and vice versa, and the at least one cross bar having a cross bar housing and a support structure extending in the cross bar housing.

37. Convertible vehicle as defined in claim 35, wherein the support structure is arranged on one side of the surface, in which the wind-deflecting flat material extends in the active position.

38. Convertible vehicle as defined in claim 36, wherein the support structure of the cross bar is arranged on the same side of the surface as a support structure of the uprights.

39. Convertible vehicle as defined in claim 1, wherein the at least two uprights and said cross bar comprise a support structure.

40. Convertible vehicle as defined in claim 39, wherein said support structure is not intersected by said surface.

41. Convertible vehicle as defined in claim 6, wherein the at least two uprights and said cross bar comprise a support structure.

42. Convertible vehicle as defined in claim 41, wherein said support structure is not intersected by said surface.

43. Convertible vehicle as defined in claim 9, wherein the at least two uprights and said cross bar comprise a support structure.

44. Convertible vehicle as defined in claim 43, wherein said support structure is not intersected by said surface.

45. Convertible vehicle as defined in claim 13, wherein the at least two uprights and said cross bar comprise a support structure.

46. Convertible vehicle as defined in claim 45, wherein said support structure is not intersected by said surface.

47. Convertible vehicle as defined in claim 20, wherein the at least two uprights and said cross bar comprise a support structure.

48. Convertible vehicle as defined in claim 47, wherein said support structure is not intersected by said surface.

49. Convertible vehicle as defined in claim 24, wherein the at least two uprights and said cross bar comprise a support structure.

50. Convertible vehicle as defined in claim 49, wherein said support structure is not intersected by said surface.

51. Convertible vehicle as defined in claim 29, wherein the at least two uprights and said cross bar comprise a support structure.

52. Convertible vehicle as defined in claim 51, wherein said support structure is not intersected by said surface.

* * * * *

UNITED STATES PATENT AND TRADEMARK OFFICE
CERTIFICATE OF CORRECTION

PATENT NO. : 7,198,321 B2
APPLICATION NO. : 10/937114
DATED : April 3, 2007
INVENTOR(S) : Eisenschmidt et al.

It is certified that error appears in the above-identified patent and that said Letters Patent is hereby corrected as shown below:

Title Page; should read;
(73) Assignee: SCAMBIA INDUSTRIAL DEVELOPMENTS AKTIENGESELLSCHAFT, Schaan (LI)

Signed and Sealed this

Twenty-seventh Day of May, 2008

JON W. DUDAS
*Director of the United States Patent and Trademark Office*